(12) United States Patent
Zoubi et al.

(10) Patent No.: US 12,425,121 B2
(45) Date of Patent: Sep. 23, 2025

(54) JAMMER DETECTION

(71) Applicant: Qualcomm Incorporated, San Diego, CA (US)

(72) Inventors: Ahmad Bassil Zoubi, San Diego, CA (US); Roberto Rimini, San Diego, CA (US); Sheng-Yuan Tu, San Diego, CA (US); Anant Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/126,361

(22) Filed: Mar. 24, 2023

(65) Prior Publication Data
US 2024/0322935 A1    Sep. 26, 2024

(51) Int. Cl.
*H04K 3/00* (2006.01)
(52) U.S. Cl.
CPC .............. *H04K 3/226* (2013.01); *H04K 3/25* (2013.01)
(58) Field of Classification Search
CPC .. H04K 3/28; H04K 3/25; H04K 3/22; H04K 3/226; H04K 3/224
See application file for complete search history.

(56) References Cited

U.S. PATENT DOCUMENTS

| | | | |
|---|---|---|---|
| 2017/0245115 A1* | 8/2017 | Lei | H04W 4/90 |
| 2019/0302250 A1 | 10/2019 | Sahin et al. | |
| 2020/0081093 A1 | 3/2020 | Rimini et al. | |
| 2020/0229102 A1 | 7/2020 | Gubeskys et al. | |
| 2022/0095151 A1 | 3/2022 | Zhang et al. | |

FOREIGN PATENT DOCUMENTS

WO    2018222268 A1    12/2018

OTHER PUBLICATIONS

CN 110431755A), Chakraborty et al., Robust Uplink Beamforming Management, Nov. 2019, pp. 1-14 (Year: 2019).*
International Search Report and Written Opinion—PCT/US2024/017262—ISA/EPO—May 14, 2024, 15 pages.

* cited by examiner

*Primary Examiner* — Keith Ferguson
(74) *Attorney, Agent, or Firm* — Smith Tempel Blaha LLC/Qualcomm Incorporated

(57) ABSTRACT

An apparatus is disclosed for jammer detection. In example aspects, the apparatus includes a wireless transceiver configured to be connected to multiple antennas. The wireless transceiver is configured to transmit a radar transmit signal using a first antenna of the multiple antennas. The wireless transceiver is also configured to receive a radar receive signal via a second antenna of the multiple antennas, with the radar receive signal associated with the radar transmit signal and comprising a jamming signal component. The wireless transceiver is additionally configured to adjust at least one transmission parameter based on a detected presence of the jamming signal component. The wireless transceiver is further configured to transmit an uplink signal based on the adjusted at least one transmission parameter.

28 Claims, 11 Drawing Sheets

JAMMER DETECTION

TECHNICAL FIELD

This disclosure relates generally to wireless transceivers and, more specifically, to detecting a jamming signal component.

BACKGROUND

To increase transmission rates and throughput, cellular and other wireless networks are using signals with higher frequencies and smaller wavelengths. As an example, 5th or 6th generation (5G or 6G)-capable devices communicate with networks using frequencies that include those at or near the extremely-high frequency (EHF) spectrum (e.g., frequencies greater than 25 gigahertz (GHz)) with wavelengths at or near millimeter wavelengths. These signals are associated with various technological challenges, such as higher path loss as compared to signals for earlier generations of wireless communications at relatively lower frequencies. For example, in certain scenarios it can be difficult for a 5G or 6G wireless signal to travel far enough to make cellular communications feasible at these higher frequencies.

To compensate for the higher path loss, transmit power levels can be increased, or beamforming can concentrate energy in a particular direction. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to achieve given cost, size, functional design objectives, and/or other relevant constraints.

SUMMARY

Apparatuses and methods are disclosed that implement jammer detection in conjunction with one or more received radar signals. A computing device can employ proximity detection to detect nearby objects using a radar receive signal. If a radar transmit signal reflects from a proximate object, the radar receive signal can include a reflection signal component. Responsive to detection of the reflection signal component, the computing device can adjust one or more transmission parameters for wireless communication based on a distance to an object, for instance, to account for an MPE limit. If a jamming signal interferes with the proximity detection, however, a device could fail to properly meet the MPE limit.

Accordingly, in example implementations, the computing device can include a jammer detection module to detect that a jamming signal has been received as part of the radar receive signal. To detect a jamming signal, the jammer detection module may utilize a jammer metric that is based on a peak value from the radar receive signal and on a statistical value derived from the radar receive signal. An example of a statistical value is a standard deviation of a noise component of the radar receive signal. Responsive to detection of a jamming signal component in the radar receive signal, a wireless transceiver can adjust at least one transmission parameter for a next uplink transmission. This transmission parameter adjustment can be performed regardless of if an affirmative proximity detection has been made to safely account for situations in which a jamming signal overpowers, or even merely obscures, a reflection signal component resulting from a proximate object. In these manners, techniques for jammer detection can enable a computing device to "safely fail" to detect a proximate object in the presence of a jamming signal by still meeting a specified MPE limit. These and other implementations are described herein.

In an example aspect, an apparatus is disclosed. The apparatus includes a wireless transceiver configured to be connected to multiple antennas. The wireless transceiver is configured to transmit a radar transmit signal using a first antenna of the multiple antennas and receive a radar receive signal via a second antenna of the multiple antennas. The radar receive signal is associated with the radar transmit signal and includes a jamming signal component. The wireless transceiver is also configured to adjust at least one transmission parameter based on a detected presence of the jamming signal component. The wireless transceiver is further configured to transmit an uplink signal based on the adjusted at least one transmission parameter.

In an example aspect, a method for detecting a jamming signal component is disclosed. The method includes transmitting a radar transmit signal using a first antenna of multiple antennas. The method also includes receiving a radar receive signal via a second antenna of the multiple antennas, with the radar receive signal being associated with the radar transmit signal and including a jamming signal component. The method additionally includes adjusting at least one transmission parameter based on a detected presence of the jamming signal component. The method further includes transmitting an uplink signal based on the adjusted at least one transmission parameter.

In an example aspect, an apparatus for jammer detection is disclosed. The apparatus includes means for transmitting a radar transmit signal using a first antenna of multiple antennas. The apparatus also includes means for receiving a radar receive signal via a second antenna of the multiple antennas, with the radar receive signal being associated with the radar transmit signal and including a jamming signal component. The apparatus additionally includes means for adjusting at least one transmission parameter based on a detected presence of the jamming signal component. The apparatus further includes means for transmitting an uplink signal based on the adjusted at least one transmission parameter.

In an example aspect, a device configured for jammer detection is disclosed. The device is configured to receive a radar receive signal including a jamming signal component. The device is also configured to cause at least one transmission parameter to be adjusted based on the jamming signal component and regardless of a presence or an absence of a reflection signal component within the radar receive signal. The device is further configured to transmit an uplink signal based on the adjusted at least one transmission parameter.

DETAILED DESCRIPTION

Figure 1:
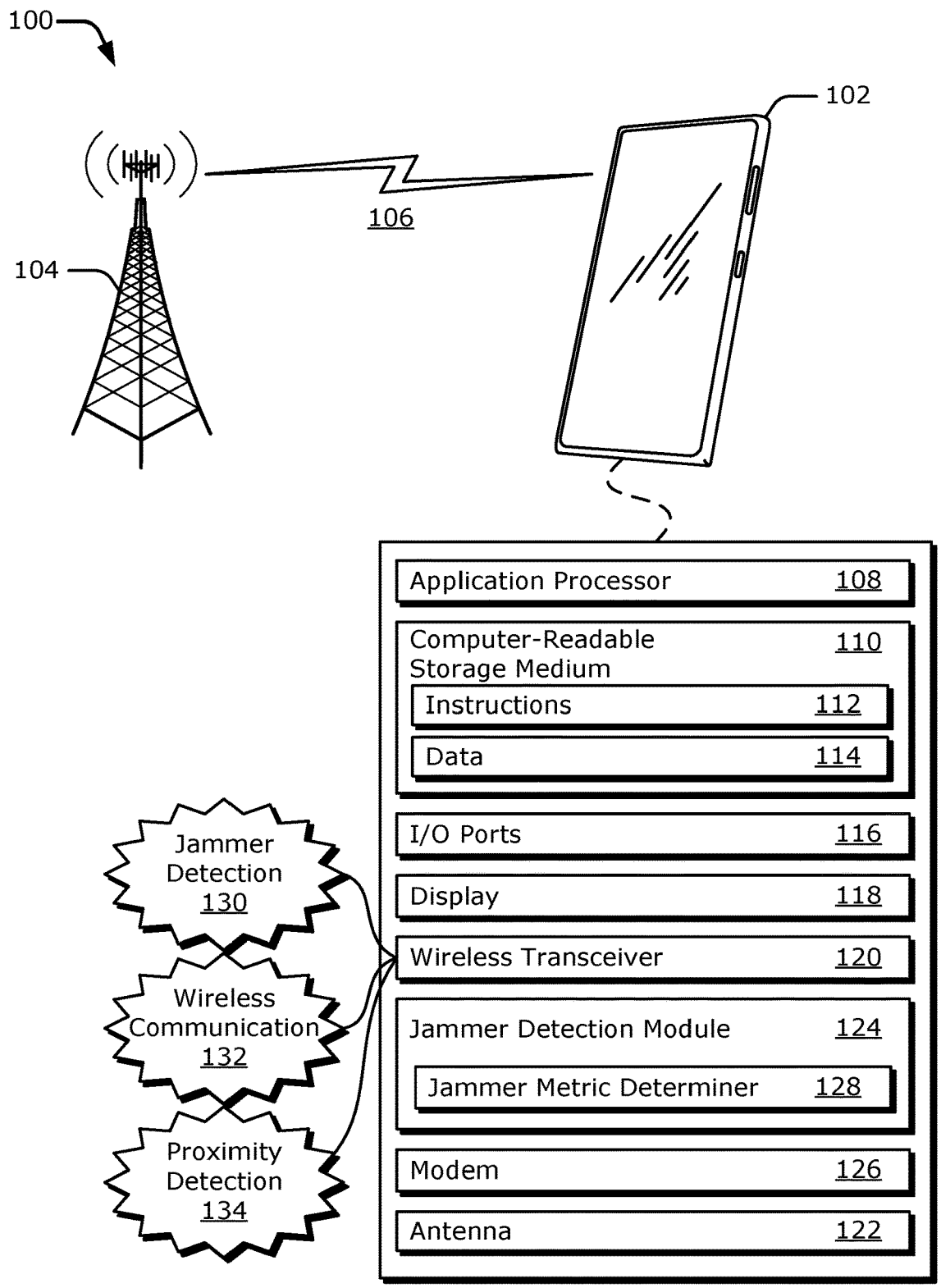
FIG. 1 illustrates an example operating environment for jammer detection.

Current high-frequency and small-wavelength communications balance performance with an obligation to meet the Federal Communications Commission's maximum permitted exposure limit (e.g., the FCC's MPE limit). Inefficient balancing can prevent devices from taking full advantage of increased data rates (e.g., those enabled by 5G wireless communications). Because exposure is affected by the proximity of a user to a device's antenna, however, techniques described in this document enable greater wireless performance while staying within the FCC's MPE limit. To do so, these techniques relate to detecting a user's proximity to a device. Based on the detected proximity, the device can balance a power density of transmitted wireless signals with a requirement to meet a particular MPE limit. As a result, the device is permitted to transmit wireless signals with higher average power levels, which enables the wireless signals to travel farther, such as between a smartphone and a remote cellular base station. Devices and techniques described herein may additionally or alternatively be used to comply with radio frequency exposure requirements promulgated by a nongovernmental organization or a jurisdiction outside of the United States.

Some proximity-detection techniques may use a dedicated sensor to detect the user, such as a camera or an infrared sensor. But these sensors may be bulky or expensive. Furthermore, a single electronic device can include multiple antennas that are positioned on different surfaces of a housing of the device (e.g., on a top, a bottom, or opposite sides). To account for each of these antennas, multiple cameras or sensors may need to be installed near each of these antennas, which further increases a cost and size of the electronic device.

Instead, devices and techniques for proximity detection that are described herein can utilize a wireless transceiver and one or more antennas within a computing device to transmit and receive radar signals and determine a range (e.g., a distance or slant range) to an object. In conjunction with proximity detection, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). Further, by actively measuring the range to an object, a surrounding environment can be continually monitored, and the transmission parameter can be incrementally adjusted to account for movement by the object while achieving a desired false-alarm rate. Additionally, devices and techniques described herein may additionally or alternatively be used for, or modified for, purposes other than exposure compliance. Examples of other purposes are to detect objects other than a user, to map an environment, to provide other forms of radio frequency (RF) or mmW sensing, to implement sensor-assisted communication, to implement joint-device communicating and sensing, and so forth.

In example operations for using radar for proximity detection, a device can transmit a radar transmit signal and receive a corresponding radar receive signal. The radar receive signal may include a reflection signal component that is created by an object that is impacted by the radar transmit signal. To perform the proximity detection, the device can identify the reflected signal and take appropriate remedial action, such as if the object may be part of a user. In some circumstances, however, a radar receive signal may have one or more other signal components that complicate the proximity detection. For example, there may be interference such as by a jamming signal (a "jammer"). This can be especially likely if a current environment of the device is crowded with numerous electromagnetic (EM) waves or other devices or if the radar transmit signal is emanated in a frequently used portion of the EM spectrum. One portion of the EM spectrum that may encounter such high usage is a part of the 5G licensed band, such as the 24.25 GHz to 28.25 GHz frequency range.

In some cases, a radar transmit signal may be emanated in this frequency range, such as with a radar chirp signal that ramps up and down between 24.25 GHz and 28.25 GHz over some period (e.g., over 3 symbols). In these situations, other surrounding devices communicating at frequencies within the 24.25 Ghz-28.25 Ghz range can jam the radar. To stay compliant with transmission power obligations (e.g., an MPE requirement), a jammer detection module of a device can detect the jamming signal and enable the electronic device to fail safely. To fail safely, the device can respond to a jamming-signal detection by performing at least one mitigating action as if a proximate object has been detected, which is described herein. The jammer detection module can compute a jammer metric that is indicative of if a jamming signal is present in a radar receive signal. In some example implementations, the jammer metric may be based on a maximum value of a radar receive signal relative to at least one statistical value (e.g., a standard deviation) derived from the signal, such as from a noise component of the radar receive signal.

Responsive to detecting that a jamming signal is being received as part of a radar receive signal, an electronic device may determine that an object detection operation is insufficiently reliable to be trusted in the presence of the jamming signal. Accordingly, to ensure that transmit power obligations are achieved, the device can take a mitigating (e.g., protective) action. Example mitigating actions include reducing a transmit power or changing a transmit antenna or beam direction. Thus, at least some implementations with a jammer detection module efficiently expand the environments in which proximity detection using radar signaling can be safely employed while adhering to an MPE or other guideline.

Some embodiments may offer a relatively inexpensive approach that can utilize existing transceiver hardware and antennas. The jammer detection module may marginally impact a design of a wireless transceiver and can be implemented in software or hardware. The described techniques can be implemented in real-time, thereby enabling responsive adaptation to various changes, including changes in the environment like object location, device movement, or signal interference patterns. With such speed of execution for jammer detection, user and/or proximity detection can be performed safely even in the potential presence of jamming signals. Nonetheless, jammer detection as described herein can be implemented outside of user and/or proximity detection scenarios.

In some implementations, a computing device may be utilized in "stand-alone" proximity-detection applications. For example, the computing device can be implemented as an automotive bumper sensor to assist with parking or autonomous driving. As another example, the computing device can be installed on a drone to provide collision avoidance. In other implementations, the computing device can selectively perform proximity detection or wireless communication. In any of these example implementations, jammer detection may be employed to enable the device to operate safely if the proximity detection fails due to an interfering signal. In such cases, multiuse of components within the wireless transceiver of a computing device may be enabled across different detection operations and/or wireless communication, which decreases cost and size of the wireless transceiver, as well as the computing device. Based on the proximity detection, and as described herein, transmission parameters can be adjusted for wireless communication to enable the wireless transceiver to meet safety guidelines, including those promulgated by a government or the wireless industry, such as a Maximum Permitted Exposure (MPE) limit as determined by the Federal Communications Commission (FCC).

FIG. 1 illustrates an example environment 100 for jammer detection. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, customer premises equipment (CPE), a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, a proximity detection apparatus for a drone or passenger vehicle, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, another smartphone, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi®); IEEE 802.15 (e.g., Bluetooth® or UWB); IEEE 802.16 (e.g., WiMAX®); and so forth. In some implementations, the wireless link 106 may wirelessly provide power and the base station 104 or the computing device 102 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), nonvolatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, Ethernet ports, audio ports, infrared (IR) ports, user interface ports such as a sensing portion of a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented, and/or the display 118 can be omitted.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, ultra-wideband (UWB) network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via an antenna 122. Components of the wireless transceiver 120 can include amplifiers, switches, mixers, analog-to-digital converters, filters, and so forth for conditioning signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122 and/or processes signals associated with proximity detection and/or jammer detection.

In the example shown in FIG. 1, the computing device 102 includes at least one jammer detection module 124 and at least one modem 126. The jammer detection module 124 can be a separate module or integrated within the wireless transceiver 120 and/or the modem 126. In general, the jammer detection module 124 can be incorporated in or realized using software, firmware, hardware, fixed logic circuitry, or combinations thereof. The jammer detection module 124 can be implemented within an integrated circuit or as part of the modem 126 or other electronic component of the computing device 102. In some implementations, the modem 126 may execute computer-executable instructions that are stored within the CRM 110 or other CRM to implement the jammer detection module 124.

In example operations, the jammer detection module 124 can perform jammer detection 130, such as by detecting a presence of a jamming signal. To do this, the jammer detection module 124 can ascertain if a jamming signal component is included as part of a radar receive signal. The radar receive signal can be associated with a previously transmitted radar transmit signal. The radar receive signal may also include a reflection signal component that corresponds to a version of the radar transmit signal as reflected by an object. The presence of the jamming signal component may obscure the presence of the reflection signal component and therefore hinder detection of the reflection signal component and the proximate object. In some cases, described techniques can be used in a passive radar or bi-static radar configuration in which one device transmits a radar signal and another device with a jammer detection module 124 receives the radar signal, which may include a reflection signal component or a jamming signal component, including potentially both such components as well as one or more other components.

In example implementations, the jammer detection module 124 includes at least one jammer metric determiner 128. The jammer metric determiner 128 can calculate a jammer metric from the radar receive signal based on one or more values, including a statistical value computed over the radar receive signal. In some cases, the jammer metric can be calculated based on a peak value of the radar receive signal and a standard deviation of a noise component of the radar receive signal. The jammer metric determiner 128 may, for instance, compute the jammer metric including a ratio of the peak value to a minimum standard deviation of the noise component computed across multiple temporal portions, or segments, of the radar receive signal. The presence of a jamming signal component can then be ascertained by comparing the jammer metric to at least one threshold.

By detecting a jamming signal, the jammer detection module 124 reduces a likelihood of the computing device 102 failing to respond properly when an object is proximate and is undetected due to a jammer. Instead, the computing device 102 can perform a mitigating action responsive to detection of the jamming signal. As a result, the computing device 102 can "fail safely" by satisfying an MPE limit even if a proximate object is undetected.

The modem 126, which can be implemented as at least one processor, controls the wireless transceiver 120 and enables jammer detection 130, wireless communication 132, and/or proximity detection 134 to be performed. The modem 126 can include a portion of the CRM 110 or can access the CRM 110 to obtain computer-readable instructions. The modem 126 can include baseband circuitry to perform high rate sampling processes that can include analog-to-digital conversion, digital-to-analog conversion, Fourier transforms, gain correction, skew correction, frequency translation, and so forth. The modem 126 can provide communication data to the wireless transceiver 120 for transmission. The modem 126 can also process a baseband version of a received signal obtained from the wireless transceiver 120 to generate data, which can be provided to other parts of the computing device 102 via a communication interface for wireless communication 132 or for a detection operation.

The computing device 102 can also include a controller (not separately shown), e.g., to realize the jammer detection module 124. The controller can include at least one processor and CRM, which stores computer-executable instructions (such as the application processor 108 or a general-purpose or dedicated microprocessor, the CRM 110, and the instructions 112). The processor and the CRM can be localized at one physical module or one integrated circuit chip or can be distributed across multiple physical modules or chips. Together, a processor and associated instructions can be realized in separate circuitry, fixed logic circuitry, hard-coded logic, and so forth. The controller can be implemented as part of the wireless transceiver 120, the modem 126, the application processor 108, a special-purpose processor configured to perform MPE techniques or jammer detection techniques, a general-purpose processor, some combination thereof, and so forth.

In example implementations, the wireless transceiver 120 supports jammer detection 130, proximity detection, and/or wireless communication 132. For instance, the wireless transceiver 120 can be configured to perform jammer and proximity detection 130 and 134 during a first time interval and to perform wireless communication 132 during a second time interval. In other example implementations, the wireless transceiver 120 supports jammer detection 130 and/or proximity detection 134 but does not support wireless communication 132. In these cases, the wireless transceiver 120 can be a transceiver of a dedicated radar system, which may be integrated within the computing device 102 or realized as a stand-alone radar system. In still other example implementations, the wireless transceiver 120 supports other applications, which can benefit from aspects of jammer or proximity detection as described herein. In additional examples, separate transceivers are respectively configured for jammer and proximity detection 130 and 134 and for wireless communication 132.

Figure 2:
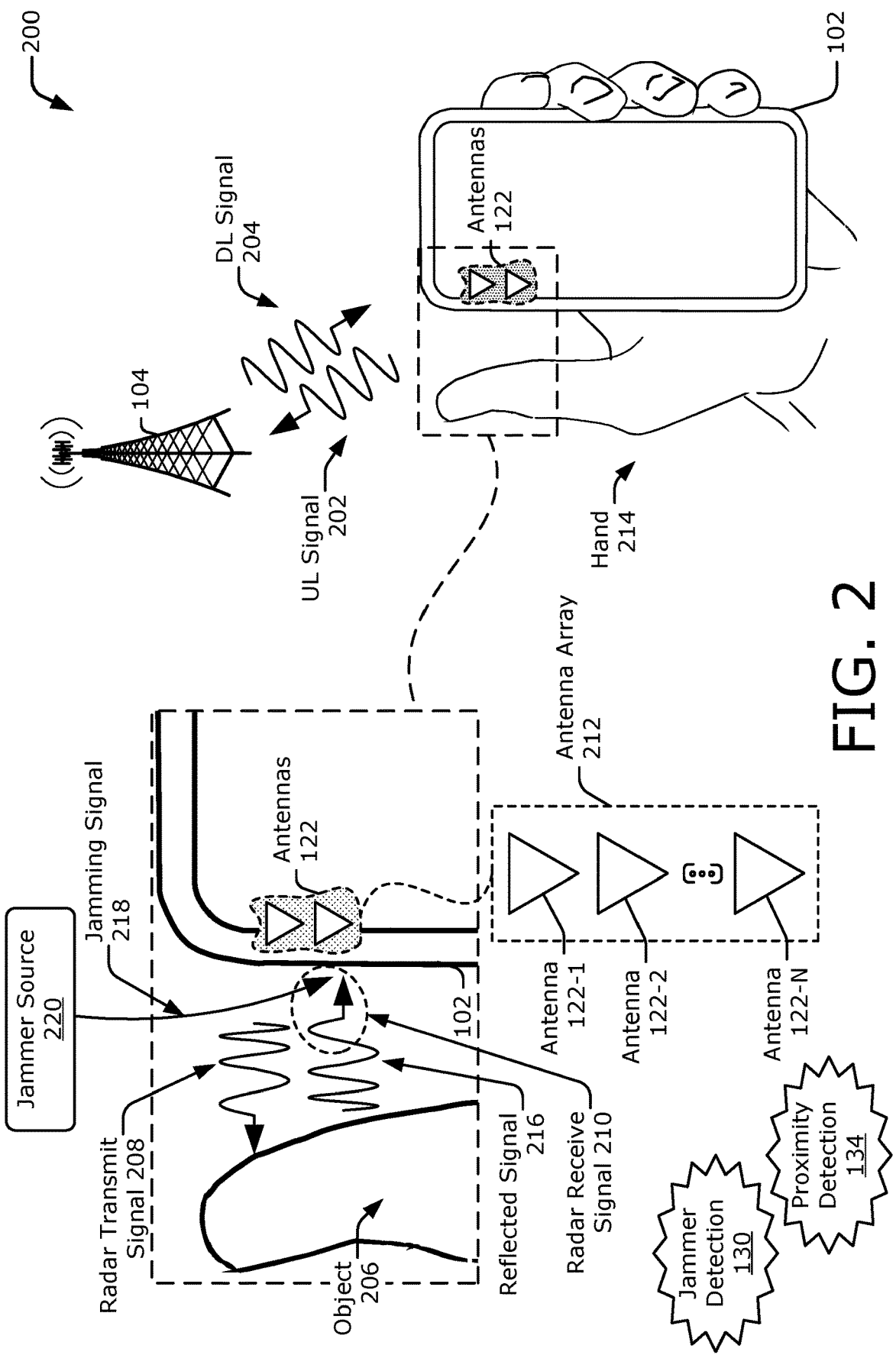
FIG. 2 illustrates an example operating environment for performing jammer detection in conjunction with proximity detection.

FIG. 2 illustrates an example operating environment 200 for performing jammer detection 130 in conjunction with proximity detection 134. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via the two or more antennas 122. A user's thumb, however, can represent a proximate object 206 that may be exposed to radiation via the uplink signal 202. Other situations are also possible in which the user represents the proximate object 206, including those in which the user is near the computing device 102 but not physically touching the computing device 102. In an example situation, the computing device 102 is positioned within arm's reach of the user on a desk. As another example situation, the computing device 102 is propped up on a table and the user is watching a video on the computing device 102 from a distance or the computing device 102 is being used as a hotspot. In still another example situation, the computing device 102 is realized as a customer premises equipment (CPE), such as an access point or fixed cellular device, where a user may occasionally approach the device.

To detect whether the object 206 exists or is within a detectable range, the computing device 102 transmits a radar transmit signal 208 via at least one of the antennas 122 and receives a radar receive signal 210 via at least another one of the antennas 122. In some cases, the radar receive signal 210 can be received during a portion of time that the radar transmit signal 208 is transmitted or is being transmitted. The radar transmit signal 208 can be implemented, for example, as a frequency-modulated continuous-wave (FMCW) signal or a frequency-modulated pulsed signal. The type of frequency modulation can include a linear frequency modulation, a triangular frequency modulation, a sawtooth frequency modulation, and so forth. Based on the radar receive signal 210, the presence of and/or the range to the object 206 can be determined. The same antennas 122 or a subset of the same antennas 122 used to communicate with the base station 104 can be used for radar operation, for example to determine a range to the object 206. In other examples, one or more of the antennas 122 used for radar operation are not used for communicating with the base station 104.

In FIG. 2, the radar receive signal 210 is shown to include both a reflected signal 216 and a jamming signal 218. The reflected signal 216 includes a version or portion of the radar transmit signal 208 that is reflected by the object 206. The jamming signal 218 originates from a jammer source 220, such as a transmitter or another computing device. Thus, the jamming signal 218 can be separate from and/or independent of the radar transmit signal 208. The jamming signal 218 may be partially or completely reflected by the object 206 or another object or may "directly" propagate between the jammer source 220 and the one or more antennas 122.

A propagation distance between the antennas 122 and the object 206, a partial absorption of the radar transmit signal 208 via the object 206, and/or an initial transmit power of the radar transmit signal 208 may cause the reflected signal 216 to be weaker relative to the jamming signal 218. The reflected signal 216 may also have a different phase or frequency relative to the radar transmit signal 208 or the jamming signal 218 based on reflection properties or motion of the object 206. In general, the reflected signal 216 contains information that can be used for detecting the object 206 and for determining a range to the object 206. In one aspect, the jamming signal 218 can exist within the radar receive signal 210 due to at least partial frequency overlap with the radar transmit signal 208 or the radar receive signal 210.

The antennas 122 may be arranged via modules and may have a variety of configurations. For example, the antennas 122 may comprise at least two different antennas, at least two antenna elements of an antenna array 212 (as shown towards the lower center portion of FIG. 2), at least two antenna elements associated with different antenna arrays, or any combination thereof. The antenna array 212 is shown to include multiple antennas 122-1 to 122-N, where N represents a positive integer greater than one. Thus, the wireless transceiver 120 (e.g., of FIGS. 1, 5, and 7) can be connected to multiple antennas 122-1 to 122-N. Further, the array 212 may be a multi-dimensional array. Additionally or alternatively, the array 212 may be configured for beam management techniques, such as beam determination, beam measurement, beam reporting, or beam sweeping. A distance between the antennas 122 within the antenna array 212 can be based on frequencies that the wireless transceiver 120 emits. For example, the antennas 122 can be spaced apart by approximately half a wavelength from one another (e.g., by approximately half a centimeter (cm) apart for frequencies around 30 GHz). The antennas 122 may be implemented using any type of antenna, including patch antennas, dipole antennas, bowtie antennas, or a combination thereof.

Consider, for example, the antennas 122 as comprising the first antenna 122-1 and the second antenna 122-2 of the antenna array 212. In operation, the first antenna 122-1 transmits the radar transmit signal 208, and the second antenna 122-2 receives the radar receive signal 210. Sometimes, due to other signal sources in the environment, such as the jammer source 220, the radar receive signal 210 can include another component instead of or in addition to the reflected signal 216. In this case, the second antenna 122-2 can instead or also receive the jamming signal 218 transmitted by the jammer source 220. The presence of the jamming signal 218 can hinder efforts to detect the object 206 via the reflected signal 216.

For example, in some cases, the jamming signal 218 can be appreciably or even significantly stronger in magnitude than the reflected signal 216. As such, the jamming signal 218 can prevent the computing device 102 from detecting the object 206. However, by employing one or more of the techniques described herein, the jamming signal 218 can be detected. If a jamming signal 218 is detected, the computing device 102 can act as if an object 206 has been detected as a failsafe to meet an applicable MPE guideline. For instance, based on an assumed or indeterminate proximity detection, a transmission parameter can be adjusted for use during wireless communication. An example sequence for switching between jammer or proximity detection 130 or 134 and wireless communication 132 is described with respect to FIG. 3.

Figure 3:
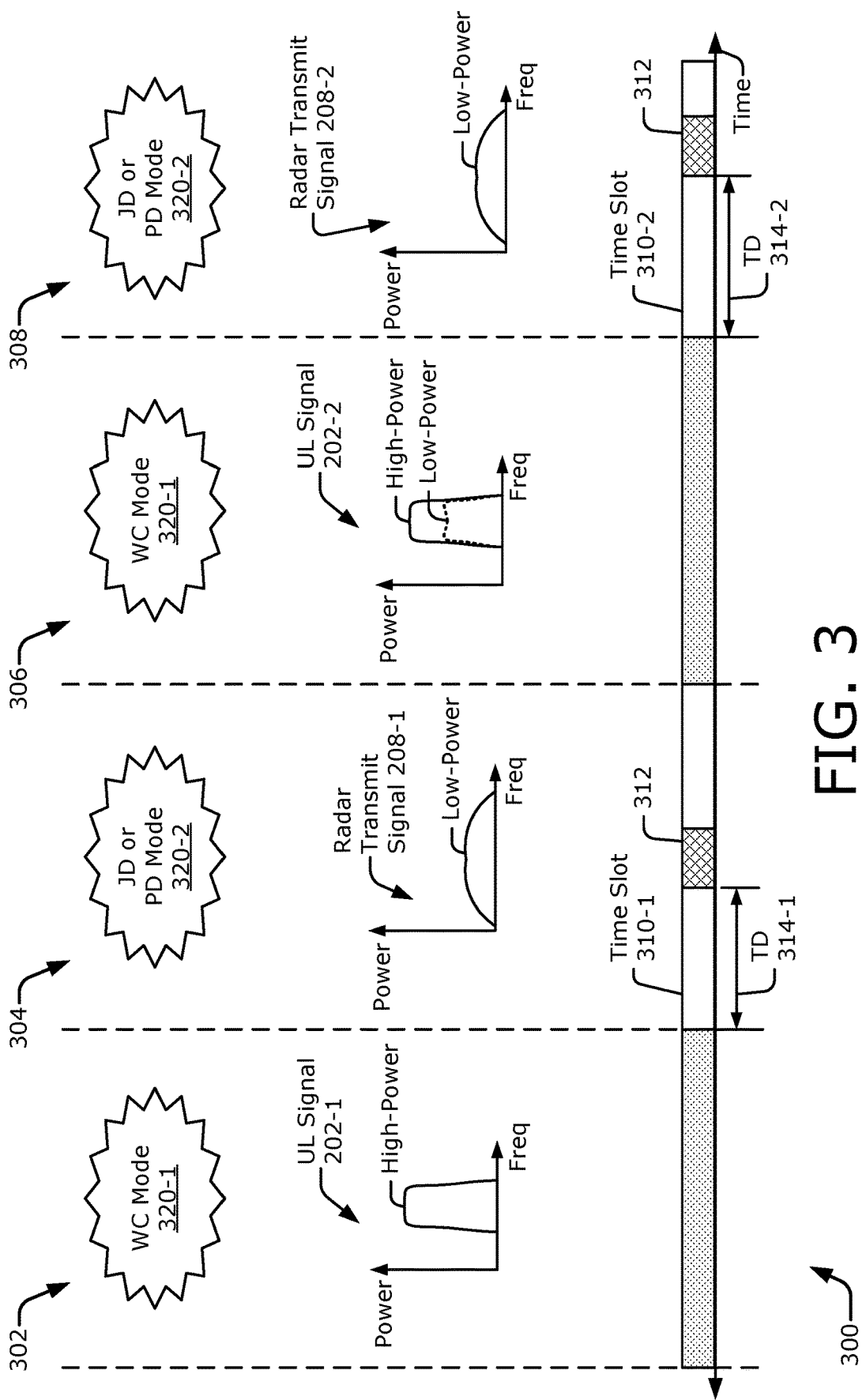
FIG. 3 illustrates an example sequence flow diagram for performing jammer detection or proximity detection with regard to wireless communication.

FIG. 3 illustrates an example sequence flow diagram 300 for performing jammer detection 130 or proximity detection 134 with regard to wireless communication 132 (each of FIG. 1), with time elapsing from left to right. Examples of a wireless communication mode 320-1 (WC mode 320-1) are shown at 302 and 306, and examples of a jammer detection or proximity detection mode 320-2 (JD or PD mode 320-2) are shown at 304 and 308. In accordance with an optional, but permitted, "inclusive or" interpretation of the disjunctive "or," the mode 320-2 can include jammer detection 130 without proximity detection 134, proximity detection 134 without jammer detection 130, or jammer detection 130 and proximity detection 134.

The jammer detection or proximity detection mode 320-2 can occur during a time slot 310, such as time slot 310-1 at 304 and time slot 310-2 at 308. A time slot 310 can include a time interval in which jammer detection 130 or proximity detection 134 is performed by the computing device 102. An example time slot 310 includes an uplink random-access-channel (RACH) time slot (UL RACH time slot). The time slot 310 can occur at fixed time intervals or at other times, between active data cycles that occur during wireless communication 132, at predetermined times as set by the modem 126, as part of an initialization process before wireless communications 132 occur, and so forth. Additionally or alternatively, some implementations of the computing device 102 can perform jammer detection 130 or proximity detection 134 responsive to detection of device movement, or based on indications that the user may be proximate to the computing device 102 (e.g., based on the wireless transceiver 120 observing a decrease in power in a downlink signal 204 or based on the application processor 108 determining that the user is interacting with the display 118 of the computing device 102).

At 302, the wireless transceiver 120 transmits a high-power (e.g., normal) uplink signal 202-1 configured to provide sufficient range to a destination, such as a base station 104. After transmitting the uplink signal 202-1, the computing device 102 transmits a radar transmit signal 208-1 during a first time slot 310-1 at 304. An example duration of a transmission of the radar transmit signal 208-1 within the first time slot 310-1 is represented by a diamond pattern at 312. A start time of the radar transmit signal 208-1 can be based on a time delay 314-1 (TD 314-1), which is relative to a start time of the first time slot 310-1.

As described above, a radar transmit signal 208 enables the computing device 102 to detect an object 206 and determine if the object 206 is "near" the computing device 102. At 304, the radar transmit signal 208-1 is represented by a low-power wide-band signal. In example implementations, the radar transmit signal 208-1 can have a bandwidth of approximately 2 GHz or more (e.g., 2 GHZ, 3 GHZ, 4 GHZ, and so forth). Based on an object or proximity detection, the wireless transceiver 120 can adjust a transmission parameter for a next uplink signal 202 to account for MPE compliance guidelines. The computing device 102 can operate analogously for jammer detection 130 at 304 as described herein.

In some examples, the jammer detection or proximity detection mode 320-2 can determine the range to the object 206, thereby enabling transmission of a next uplink signal 202 to comply with safety guidelines, such as a maximum power density. Because power density is proportional to transmit power and inversely proportional to range, an object at a closer range is exposed to a higher power density than another object at a farther range for a same transmit power level. Therefore, a similar power density at the object 206 can be achieved by increasing the transmit power level if the object 206 is at a relatively farther range and decreasing the transmit power level if the object 206 is at a relatively closer range. In this way, the wireless transceiver 120 can adjust transmission of the uplink signal 202 to enable the power density at the object 206 for both the closer range and the farther range to be below the maximum power density. At the same time, because the range is known, the transmit power level can be increased to a level that facilitates wireless communication 132 and comports with the compliance guideline.

At 306, the wireless transceiver 120 transmits a next uplink signal 202-2. In the depicted example, the uplink signal 202-2 can be a high-power uplink signal if an object 206 is not detected at 304. Alternatively, the uplink signal 202-2 can be a low-power uplink signal if an object 206 is detected at 304. The low transmit power can be, for example, between approximately five and twenty decibel-milliwatts (dBm) less than the high-power signal at 302. The relatively low-power uplink signal can also be transmitted as the uplink signal 202-2 if a jamming signal 218 (of FIG. 2) is detected during the jammer detection or proximity detection mode 320-2 at 304 to account for the possibility that a proximate object went undetected due to a presence of the jamming signal 218.

In addition to or instead of changing a power, the uplink signal 202-2 at 306 can be transmitted using a different antenna within the computing device 102 or using a different beam steering angle (e.g., different than the antennas 122 or the beam steering angle used for transmitting the uplink signal 202-1 at 302). In some implementations, the computing device 102 uses a different beamforming configuration to improve signal-to-noise ratio based on the angle to the object 206 or an angle of incidence of a jamming signal 218. Although not shown, the wireless transceiver 120 can alternatively "skip" or "delay" the wireless communication mode 320-1 at 306 and perform jammer detection 130 or proximity detection 134 using another antenna or a different transmit power level to detect one or more objects (e.g., the object 206) at various locations, distances, or angles around the computing device 102. While certain operations are described above based on a range to the object 206, it will be appreciated that operations in the wireless communication mode 320-1 at 306 or adjustments made pursuant to the jammer detection or proximity detection mode 320-2 may be based merely upon whether the object 206 is present or not (e.g., detected or not), irrespective of the range thereto (e.g., regardless of whether the range can be or has been determined).

At 308, the wireless transceiver 120 and the antenna 122 transmit another radar transmit signal 208-2 during a second time slot 310-2 to attempt to detect the object 206 (or another object) or an interfering signal. A second time delay 314-2 (TD 314-2) associated with the radar transmit signal 208-2 can be similar to or different from the first time delay 314-1. The wireless communication mode 320-1 and the jammer detection or proximity detection mode 320-2 are illustrated separately in FIG. 3 and do not overlap in some examples, but in other examples certain wireless communications may be transmitted during the jammer detection or proximity detection mode 320-2 or a portion thereof.

By scheduling multiple radar transmit signals 208 over some time period, transmission of the uplink signal 202 can be dynamically adjusted based on a changing environment or movement by the object 206 or other objects or jamming signals that vary over time, direction, or intensity. Furthermore, appropriate adjustments can be made to balance wireless communication performance with beam management and compliance with radiation requirements. The sequence described above can also be applied to other antennas. The other antennas and the antennas 122 may transmit multiple radar transmit signals 208 sequentially or in parallel. Responsive to transmission of each radar transmit signal 208, the computing device 102 may attempt to receive and process a radar receive signal 210 as part of the jammer detection or proximity detection mode 320-2. Aspects of processing radar receive signals 210, including example implementations of jammer detection, are described next.

Figure 4:
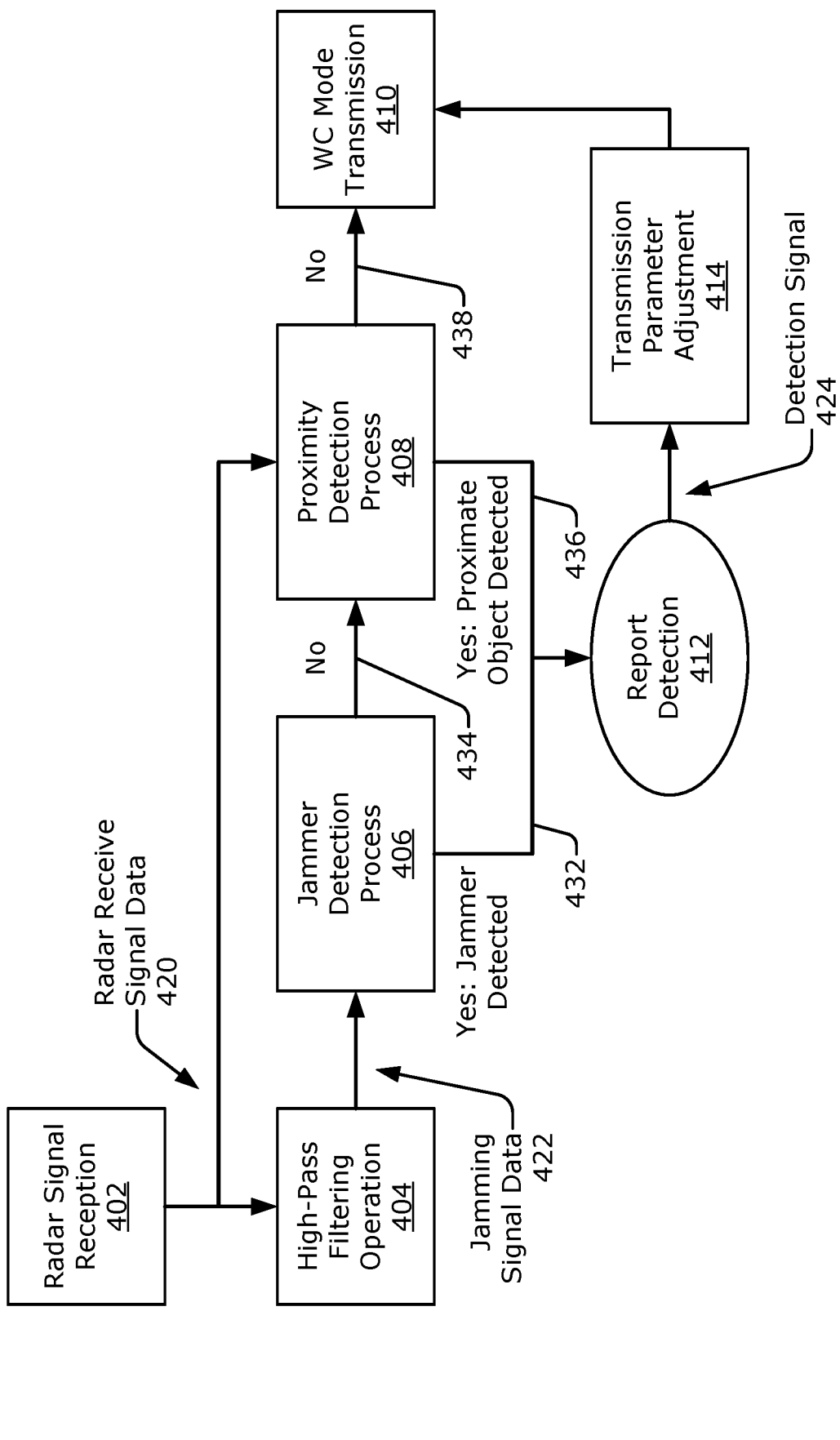
FIG. 4 illustrates an example scheme for performing jammer detection in conjunction with proximity detection.

FIG. 4 illustrates an example scheme 400 for performing jammer detection in conjunction with proximity detection. With proximity detection, an object may be detected using a radar-based technique. To comport with an MPE or other governmental or industry guideline, a computing device can adjust a transmission parameter to reduce an amount of signal power that is directed toward or to the detected object. If a jamming signal is present, however, the radar-based technique may be unable to detect the object or unable to accurately determine a range to the object. To enable the device to meet an MPE or other guideline in the absence of adequate information about potential objects due to an interfering jammer, the device can adjust the transmission parameter based on a detected presence of a jamming signal.

Thus, the device can fail to detect an object but nonetheless still operate in a safe manner by proactively acting as if an object has been detected responsive to a jamming signal being detected in a radar receive signal. In some cases, a jammer detection module can "overrule" or "bypass" a proximity detection module in the sense that whether a detection signal from the proximity detection module is negative or affirmative, an affirmative detection signal from the jammer detection module can control a response of the wireless transceiver. For example, the wireless transceiver can perform one or more operations as if an affirmative proximity detection signal has been generated in response to an affirmative jammer detection signal, regardless of an actual value of the proximity detection signal.

As shown in FIG. 4, the scheme 400 can include reception of a radar signal at 402. A radar receive signal (e.g., the radar receive signal 210 of FIG. 2) can be processed as radar receive signal data 420. The radar receive signal data 420 may be, for instance, a digital version of the radar receive signal, a time-domain version of the radar receive signal, one or more samples of the radar receive signal, some combination thereof, and so forth. The radar receive signal data 420 may be in baseband or near baseband, and thus may be associated with signals that have been downconverted after being received by an antenna. The radar receive signal data 420 may be provided to a high-pass filtering operation 404 before being provided to a jammer detection process 406, and to a proximity detection process 408, which is described below.

In example implementations, the high-pass filtering operation 404 filters the relatively low frequencies of the radar receive signal data 420 to filter out the radar beat signal that contains object detection information, if any is present. A jamming signal, if present, remains in the higher-frequency wide-band portion of the signal, which is referred to as the jamming signal data 422. The jammer detection process 406 accepts the jamming signal data 422 and processes this data to produce an affirmative detection signal or a negative detection signal. Example implementations for jammer detection are described below with reference to FIGS. 7 to 10. The jammer detection process 406 can produce an affirmative jammer detection signal 432 or a negative jammer detection signal 434. The affirmative jammer detection signal 432 results in a reported detection at 412, which is described below.

In some cases, the jammer detection process 406 and the proximity detection process 408 can be operated at least partially in parallel or overlapping temporally to some extent. This approach can produce a faster decision as to if a transmission parameter is to be adjusted if no jamming signal is detected. In other cases, the proximity detection process 408 can operate after the jammer detection process 406 in response to the negative jammer detection signal 434. The sequential operational approach can lower power usage if a jamming signal is detected or reduce processing capabilities required by a device by obviating a need to have sufficient resources to perform two processes simultaneously. The jammer detection signals 432, 434 need not be signals that are conveyed between different circuits or components (although they may be); rather, the jammer detection signals 432, 434 may merely be a representation of a determination or identification (e.g., in a processor) of whether a jammer has been detected, and/or may include the setting of a register or value.

The proximity detection process 408 accepts the radar receive signal data 420 and processes this data to produce an affirmative detection signal or a negative detection signal. For example, the proximity detection process 408 can detect an object based on detecting that a radar receive signal includes a reflection component created by an object from an associated radar transmit signal. Further, the proximity detection process 408 can determine a range to the object based on a frequency of the radar receive signal that includes the reflection component. The proximity detection process 408 can generate an affirmative or negative detection signal based on the determined range and one or more range thresholds, which may be derived from an MPE-related or other guideline in conjunction with a relevant transmit power. Thus, the proximity detection process 408 can produce an affirmative proximity detection signal 436 or a negative proximity detection signal 438. The affirmative proximity detection signal 436 results in a reported detection at 412, which is described next. The proximity detection signals 436, 438 need not be signals that are conveyed between different circuits or components (although they may be); rather, the proximity detection signals 436, 438 may merely be a representation of a determination or identification (e.g., in a processor) of whether an object has been detected, and/or may include the setting of a register or value.

Based on an affirmative jammer detection signal 432 or an affirmative proximity detection signal 436, a detection signal 424 is generated. This affirmative detection signal 424 can result in a transmission parameter adjustment 414. The detection signal 424 need not be a signal that is conveyed between different circuits or components (although it may be); rather, the detection signal 424 may merely be a representation of a determination or identification (e.g., in a processor) that one of a jammer or object has been detected, and/or may include the setting of a register or value. The transmission parameter adjustment 414 can include adjusting, based on the detection signal 424, at least one transmission parameter to decrease a radiation level corresponding to transmission of the radar transmit signal using a given antenna. To decrease the radiation level associated with emanation from the given antenna, the adjustment may include, for example, reducing a transmission power level at the given antenna, changing a radiation pattern emanated from the given antenna (e.g., changing a beam angle), or switching transmission from the given antenna to a different antenna of multiple antennas (e.g., of a same antenna array or a different antenna array). Any one or more of these adjustments or another adjustment can reduce a radiation level associated with EM emanation from the given antenna.

A transmission 410 can be made in a wireless communication (WC) mode (e.g., a wireless communication mode 320-1 of FIG. 3) based on the adjusted at least one transmission parameter. Alternatively, the wireless-communication mode transmission 410 can be made without a transmission parameter adjustment 414 based on a negative jammer detection signal 434 and a negative proximity detection signal 438. However, if the jammer detection process 406 generates an affirmative jammer detection signal 432 or the proximity detection process 408 generates an affirmative proximity detection signal 436, then a detection signal 424 is generated. The transmission parameter adjustment 414 is performed based on the affirmative detection signal 424. In these manners, detection of a jamming signal by the jammer detection process 406 can cause a transmission parameter adjustment 414 regardless of a result of the proximity detection process 408.

Figure 5:
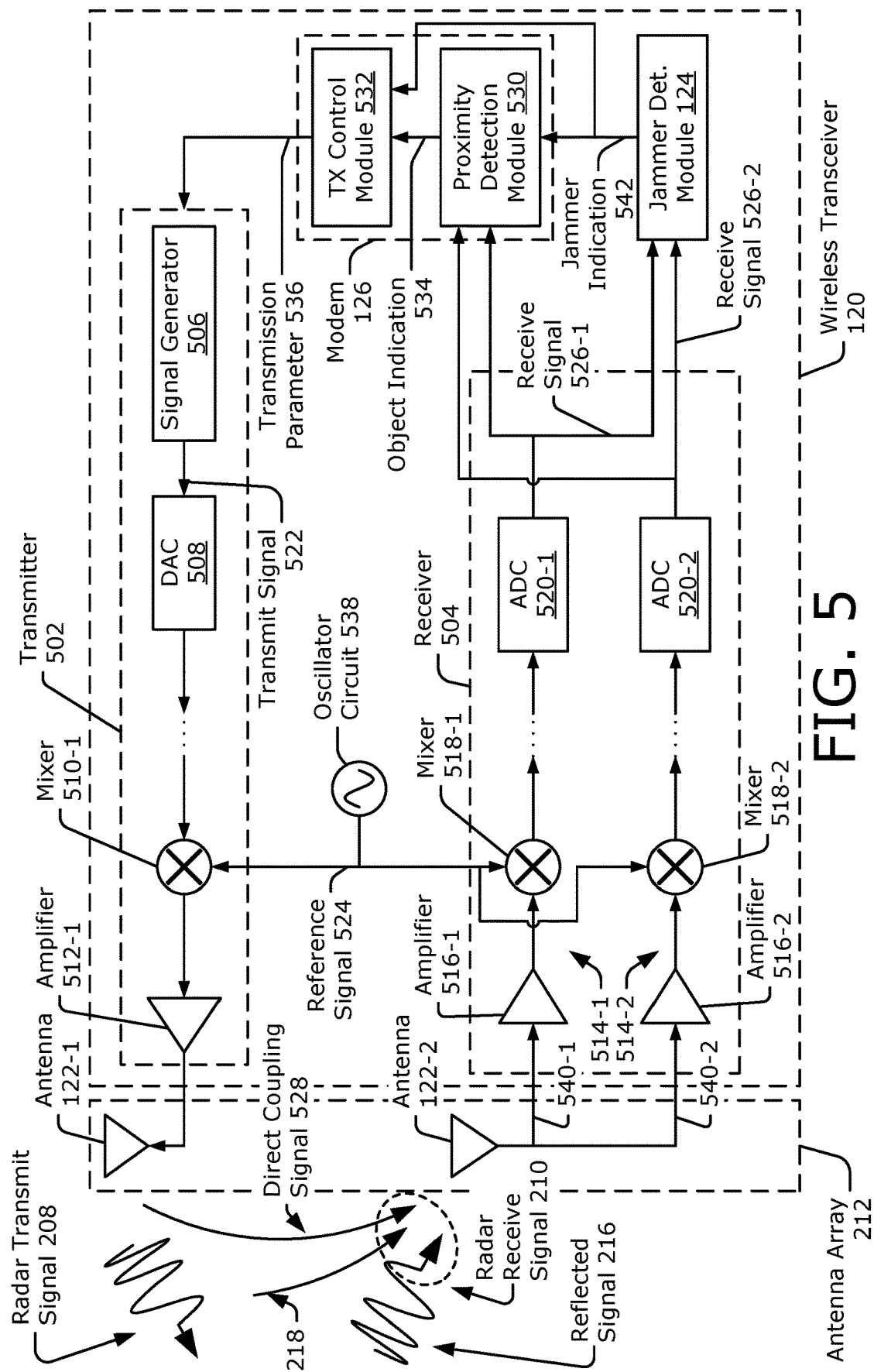
FIG. 5 illustrates examples of a wireless transceiver, a jammer detection module, a proximity detection module, and a modem that can perform jammer detection and proximity detection.

FIG. 5 illustrates examples of a wireless transceiver 120, a jammer detection module 124, a proximity detection module 530, and a modem 126 that can perform jammer detection and proximity detection. The wireless transceiver 120 can be implemented as a direct-conversion transceiver or a superheterodyne transceiver. In the depicted configuration, the wireless transceiver 120 includes a transmitter 502 and a receiver 504. The transmitter 502 is coupled between the modem 126 and the antenna array 212. The transmitter 502 is shown to include at least one signal generator 506, at least one digital-to-analog converter (DAC) 508, at least one mixer 510-1, and at least one amplifier 512-1 (e.g., a power amplifier).

The signal generator 506 can generate a digital signal (e.g., a transmit signal 522), which may be used to derive the radar transmit signal 208 or the uplink signal 202 (of FIGS. 2 and 3). Although shown separately, the signal generator 506 or a portion thereof may be implemented in the modem 126. The transmitter 502 can be connected to at least one feed port (not shown) of the antenna 122-1, such as at least one differential feed port of a dipole antenna, at least one polarized feed port of a patch antenna, or at least one directional feed port of a bowtie antenna. In some examples, the radar transmit signal 208 is generated directly in an RF circuit without use of the digital signal 522 or the signal generator 506.

The receiver 504 is coupled between the antenna array 212 and the jammer detection module 124 or the proximity detection module 530. In general, the receiver 504 may include at least two channels 514 (or layers), which are coupled to different feed ports of one or more antennas 122. In the depicted configuration, channels 514-1 and 514-2 represent two parallel channels within the receiver 504 that are respectively connected to two feed ports of the antenna 122-2. Although a single antenna 122-2 is shown to be connected to the two channels 514-1 and 514-2, the channels 514-1 and 514-2 can alternatively be respectively connected to two different antennas 122, such as the second antenna 122-2 and the Nth antenna 122-N of FIG. 2. The channels 514-1 and 514-2 respectively include at least one amplifier 516-1 and 516-2 (e.g., a low-noise amplifier), at least one mixer 518-1 and 518-2, and at least one analog-to-digital converter (ADC) 520-1 and 520-2. Although depicted separately, the DAC 508 and/or the ADCs 520 may be implemented as part of the modem 126.

The wireless transceiver 120 also includes an oscillator circuit 538 (e.g., a local oscillator circuit), which generates a reference signal 524 enabling the mixers 510-1, 518-1, and 518-2 to upconvert or downconvert analog signals within the transmitter 502 or the receiver 504, respectively. In some implementations, the oscillator circuit 538 includes two oscillators and a selection circuit. The two oscillators can include a local oscillator, which generates a local oscillator signal having a continuous tone, and a frequency-modulated local oscillator (e.g., a voltage-controlled oscillator), which generates a frequency-modulated signal. During operation, the selection circuit selectively passes the frequency-modulated signal or the local oscillator signal as the reference signal 524. An example of an oscillator circuit 538 that includes two oscillators and a selection circuit is described below with reference to FIG. 6. The transmitter 502 and the receiver 504 can also include other additional components that are not depicted in FIG. 5, such as filters (e.g., low-pass filters or band-pass filters), phase shifters, additional mixers, switches, and so forth.

During wireless communication 132, the wireless transceiver 120 can transmit the uplink signal 202 or receive the downlink signal 204 (of FIGS. 2 and 3). In particular, the signal generator 506 generates the transmit signal 522, which includes communication data for wireless communication 132. The digital-to-analog converter 508 converts the transmit signal 522 from the digital domain to the analog domain. The oscillator circuit 538 generates the local oscillator signal as the reference signal 524. The mixer 510-1 upconverts the transmit signal 522 to radio frequencies using the reference signal 524. The amplifier 512-1 amplifies the radio-frequency transmit signal 522, and the antenna 122-1 transmits the amplified transmit signal 522 as the uplink signal 202.

During wireless communication 132, the antenna 122-2 can receive the downlink signal 204. At least one of the receive channels within the receiver 504 processes the downlink signal 204. For example, the amplifier 516-1 amplifies the downlink signal 204, and the mixer 518-1 downconverts the amplified downlink signal 204 using the reference signal 524, which is the local oscillator signal for wireless communication 132. The analog-to-digital converter 520-1 converts the downlink signal 204 from the analog domain to the digital domain to produce a receive signal 526-1. The digital version of the downlink signal 204 can be passed to the modem 126 or a data processor in the modem for further processing. Although not explicitly depicted this way in FIG. 5, the jammer detection module 124 or the proximity detection module 530, including both based on a permitted inclusive-or interpretation of the disjunctive "or," can be bypassed during wireless communication 132.

During jammer detection 130 (or proximity detection 134), the transmitter 502 generates the radar transmit signal 208 via the antenna 122-1. In particular, the signal generator 506 can generate the transmit signal 522, which can include a single continuous tone. The digital-to-analog converter 508 converts the transmit signal 522 from the digital domain to the analog domain. The oscillator circuit 538 generates the frequency-modulated signal as the reference signal 524. The mixer 510-1 upconverts and modulates the analog transmit signal 522 using the reference signal 524—e.g., to produce a frequency-modulated radio-frequency transmit signal 522. The amplifier 512-1 amplifies this transmit signal 522, and the antenna 122-1 transmits the amplified transmit signal 522 as the radar transmit signal 208.

The receiver 504 may receive different versions 540 of the radar receive signal 210 via the antenna 122-2. To do so, the response of the antenna 122-2 is separated into the versions 540-1 and 540-2 via two feed ports (not shown). Using the mixers 518-1 and 518-2, the channels 514-1 and 514-2 of the receiver 504 demodulate the radar receive signal 210 using the reference signal 524. As a result of the mixing operations, the mixers 518-1 and 518-2 produce receive signals 526-1 and 526-2, respectively, which may be converted into digital version of the signals 526-1 and 526-2 using the ADCs 520-1 and 520-2, respectively.

The receive signals 526-1 and 526-2 include a beat frequency, which is indicative of a frequency offset between the radar transmit signal 208 and the radar receive signal 210. The beat frequency may have one or more components or characteristics that are indicative of a range to the object 206 that are determinable by the proximity detection module 530. The radar receive signal 210, and a resulting receive signal 526, may also or instead include a direct coupling component caused by a direct coupling signal 528 that propagates between the antenna 122-1 and the antenna 122-2 within or outside of a housing a computing device.

Additionally or alternatively, the radar receive signal 210, and a resulting receive signal 526, may include a jamming signal component. The jammer detection module 124 can detect the jamming signal component in the receive signal 526 as described herein. In response to a jamming signal detection, the jammer detection module 124 can generate and output a jammer indication 542, such as an affirmative jammer detection signal 432 (of FIG. 4). Otherwise, the jammer detection module 124 can generate and output the jammer indication 542 for a negative jammer detection signal 434. A transmission (TX) control module 532 can receive the jammer indication 542 via the proximity detection module 530 or without being fed through the proximity detection module 530. In this way, the jammer detection module 124 can control, at least partially, emanation of EM signaling in the presence or absence of a proximate object.

In FIG. 5, the modem 126 includes at least one proximity detection module 530 and at least one transmitter control module 532 (TX control module 532). Although not shown in FIG. 5, the modem 126 can include other components, such as the jammer detection module 124. The proximity detection module 530 obtains at least one receive signal 526 and generates an object indication 534, which indicates whether or not an object 206 is detected. The object indication 534 can also include a range to a detected object 206.

Based on the jammer indication 542 or the object indication 534, the transmitter control module 532 generates at least one transmission parameter 536 that controls one or more transmission attributes for wireless communication 132. The transmission parameter 536 can specify one or more transmission-related aspects of the uplink signal 202, such as a power level, polarization, frequency, duration, beam shape, beam steering angle, a selected antenna that transmits the uplink signal 202 (e.g., another antenna that is on a different surface of the computing device 102 and is not obstructed by the object 206 or interfered with by a jamming signal), or combinations thereof. Some transmission parameters 536 may be associated with beam management, such as those that define an unobstructed volume of space for beam sweeping.

By specifying the transmission parameter 536, the modem 126 can, for example, cause the transmitter 502 to decrease power if an object 206 is close to the computing device 102 or increase power if the object 206 is at a farther range or is not detectable. The ability to detect the object 206 and control the transmitter 502 enables the modem 126 to balance the performance of the computing device 102 with regulatory compliance guidelines. In other implementations, the application processor 108 or another component (e.g., a sensors hub) can perform one or more of these functions and include the proximity detection module 530 and/or the jammer detection module 124. To ensure compliance with regulatory guidelines, the modem 126 can also adjust at least one transmission parameter 536 in similar or different manners if a jamming signal is detected by the jammer detection module 124 because the jamming signal could be obscuring or preventing detection of an object that is present.

Although not explicitly shown, multiple antennas 122 can be used to sense additional versions 540 of the radar receive signal 210 (e.g., a third version or a fourth version) and provide additional receive signals 526 (e.g., a third receive signal 526 or a fourth receive signal 526) to the jammer detection module 124 or the proximity detection module 530. For example, two or more patch antennas may be used to receive the radar receive signal 210. With multiple received signals 526, the computing device 102 can increase a probability of detecting an object 206 (or accurately determining a range thereof), increase an accuracy of a jamming-signal detection, or decrease a probability of false alarms. The transmitter control module 532 can also make different adjustments based on which one or more antennas 122 or what quantity of antennas 122 detect an object 206 or a jamming signal. In some cases, these adjustments may impact beam management by focusing available beams or targeting a spatial area for beam determination.

With respect to proximity detection, in some situations, the object 206 may be closer to one of the antennas 122 than another, which enables the one antenna 122 to detect the object 206 while the other antenna 122 is unable to detect the object 206. In this case, the transmitter control module 532 can decrease a transmit power of the antenna 122 that detected the object 206 relative to the other antenna 122. In some implementations, the multiple antennas 122 can be used to further characterize the relationship between the object 206 and the antennas 122, such as by using triangulation or digital beamforming to estimate an angle to the object 206. In this way, the transmitter control module 532 can adjust the transmission parameter 536 to steer the uplink signal 202 away from the object 206. In general, the proximity detection module 530 can detect one or more objects using at least one receive signal 526 obtained from the receiver 504.

With respect to jammer detection, in some situations, a jamming signal 218 can interfere more with one of the antennas 122 than another, which may enable the one antenna 122 to detect the jamming signal 218 while the other antenna 122 is unable to detect the jamming signal 218. In this case, the transmitter control module 532 can decrease a reception focus of the antenna 122 that detected the jamming signal 218 relative to the other antenna 122. In some implementations, the multiple antennas 122 can be used to further characterize the relationship between the jamming signal 218 and the antennas 122, such as by using triangulation or digital beamforming to estimate an angle of incidence at the antenna array 212 and/or a direction of origination of the jamming signal 218. In this way, the transmitter control module 532 can adjust the transmission parameter 536 to steer the uplink signal 202 away from interference caused by the jamming signal 218. In general, the jammer detection module 124 can detect one or more jamming signals 218 using at least one receive signal 526 obtained from the receiver 504. Operations of the jammer detection module 124 are further described with respect to FIGS. 7 to 11.

Figure 6:
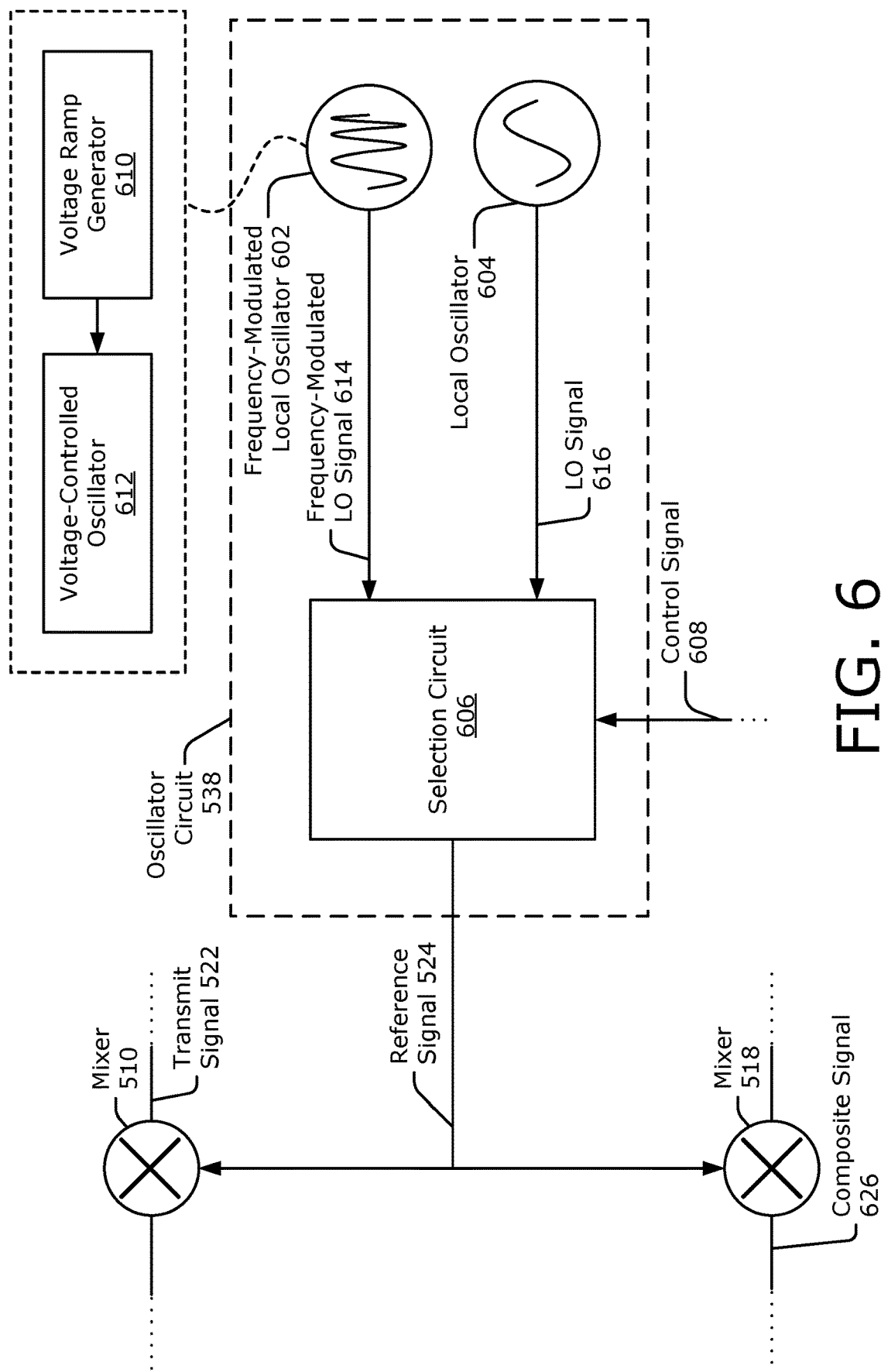
FIG. 6 illustrates an example oscillator circuit for supporting wireless communication in conjunction with jammer detection or proximity detection.

FIG. 6 illustrates an example oscillator circuit 538 for supporting wireless communication 132 in conjunction with jammer detection 130 or proximity detection 134. In the depicted configuration, the oscillator circuit 538 includes a frequency-modulated local oscillator 602, a local oscillator 604, and a selection circuit 606. The frequency-modulated local oscillator 602 can be implemented using, for instance, a voltage ramp generator 610 and a voltage-controlled oscillator 612. As an example, the voltage-controlled oscillator 612 can be implemented using a wideband open-loop voltage-controlled oscillator. By controlling an input voltage to the voltage-controlled oscillator 612, the voltage ramp generator 610 can provide a variety of different voltage ramps to enable the voltage-controlled oscillator 612 to generate a variety of different frequency-modulated local oscillator signals 614 (e.g., a linear frequency-modulated (LFM) signal, a sawtooth frequency-modulated signal, a triangular frequency-modulated signal, and so forth).

The local oscillator 604 can include, for example, a quartz crystal, an inductor-capacitor (LC) oscillator, an oscillator transistor (e.g., a metal-oxide semiconductor field-effective transistor (MOSFET)), a transmission line, a diode, a piezoelectric oscillator, and so forth. A configuration of the local oscillator 604 can enable a target phase noise and quality factor to be achieved for wireless communication 132. In general, the local oscillator 604 generates a local oscillator signal 616 (LO signal 616) with a steady (e.g., substantially constant) frequency. Although not explicitly shown, the oscillator circuit 538 can also include a phase-lock loop (PLL) or automatic gain-control (AGC) circuit. Either of these components can be coupled to the local oscillator 604 to enable the local oscillator 604 to oscillate at a steady frequency.

The selection circuit 606 can include a switch or a multiplexer that is controlled by the modem 126 (e.g., of FIG. 5). Based on a control signal 608, the selection circuit 606 connects or disconnects the frequency-modulated local oscillator 602 or the local oscillator 604 to or from the mixers 510 and 518. If the control signal 608 is indicative of the wireless transceiver 120 performing jammer detection 130 (or proximity detection 134), the selection circuit 606 connects the frequency-modulated local oscillator 602 to the mixers 510 and 518 to provide the frequency-modulated local oscillator signal 614 as the reference signal 524. Alternatively, if the control signal 608 is indicative of the wireless transceiver 120 performing wireless communication 132, the selection circuit 606 connects the local oscillator 604 to the mixers 510 and 518 to provide the local oscillator signal 616 as the reference signal 524. The selection circuit 606 enables the wireless transceiver 120 to quickly transition between performing operations for jammer detection 130 or proximity detection 134 and operations for wireless communication 132.

Although the frequency-modulated local oscillator 602 and the selection circuit 606 are shown in FIG. 6, other implementations of the oscillator circuit 538 may not include these components. For example, the local oscillator 604 can provide the local oscillator signal 616 as the reference signal 524 for jammer detection 130 or proximity detection 134 and for wireless communication 132. In this case, the modem 126 (or a signal generator, such as the signal generator 506, within the wireless transceiver 120) can apply a frequency modulation to the analog baseband signal (e.g., the transmit signal 522) to enable performance of the jammer detection 130 or the proximity detection 134. In other examples, respective LO circuitry for wireless communication 132 and proximity detection 134 or jammer detection 130 are implemented, and respective reference signals 524 are provided to mixers 510 and/or 518 shared for wireless communication and proximity or jammer detection or to respective mixers. FIG. 6 also depicts a composite signal 626 that is processed in the receive chain, such as a signal corresponding to receive signal 526 (of FIG. 5). The composite signal 626 can include multiple components that are received via at least one antenna as part of some signal. Example signal components for a radar receive signal are described next with respect to FIG. 7.

Figure 7:
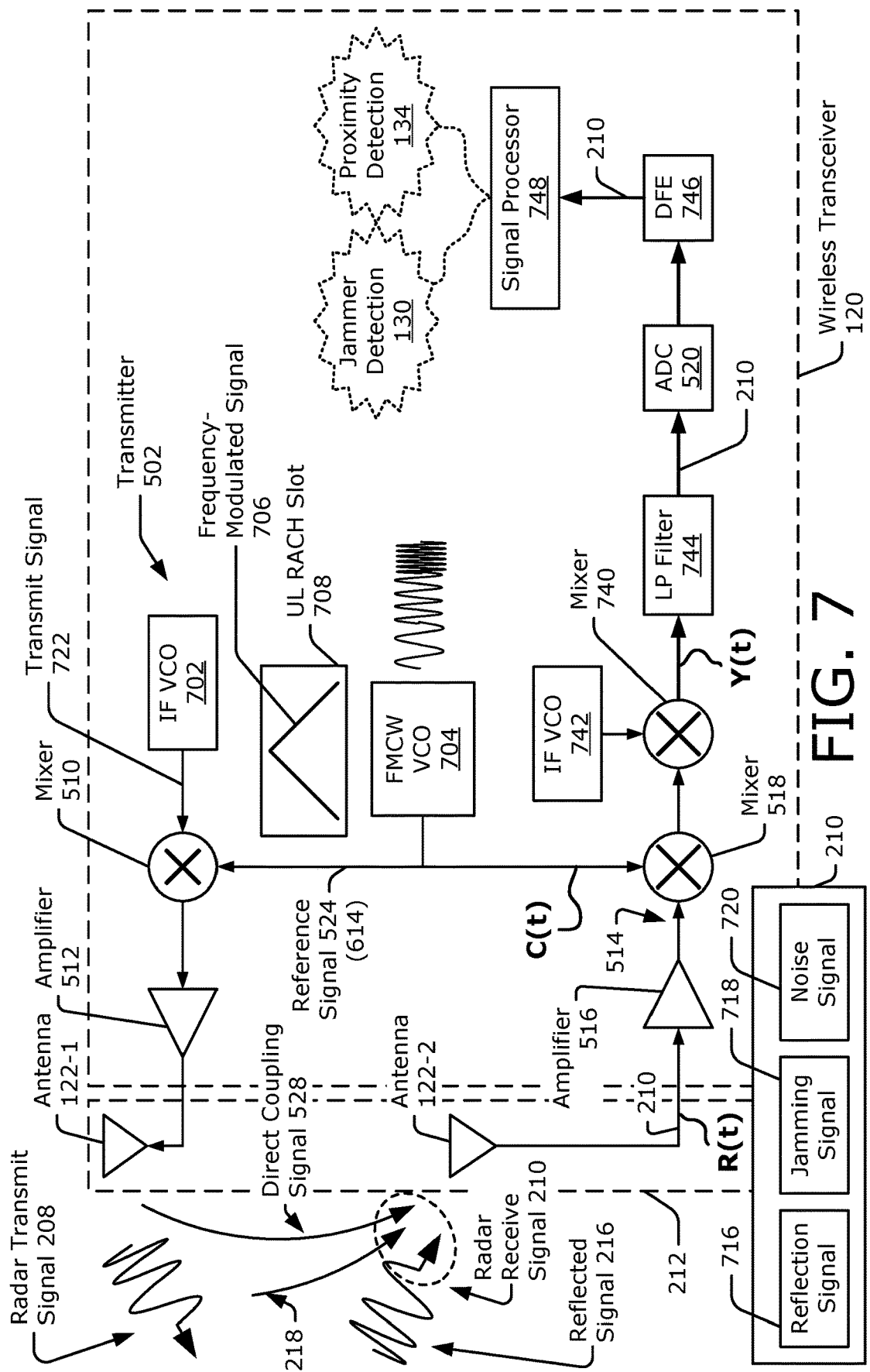
FIG. 7 illustrates additional examples of a wireless transceiver for jammer detection in which a radar receive signal can include multiple signal components, including a jamming signal component or a reflection signal component.

FIG. 7 illustrates additional examples of a wireless transceiver 120 for jammer detection 130 in which a radar receive signal 210 can include multiple signal components, including a jamming signal component 718 or a reflection signal component 716. The wireless transceiver 120 of FIG. 7 can be similar to the wireless transceiver 120 of FIG. 5. Some components, however, are omitted for clarity (e.g., a second receive chain). Further, the example wireless transceiver 120 of FIG. 7 is depicted as a superheterodyne transceiver having an intermediate-frequency (IF) portion. Nonetheless, the principles described herein for jammer detection are applicable to direct conversion architectures.

In example implementations, the transmitter 502 provides a transmit signal 722 via an intermediate-frequency VCO 702 (IF VCO 702). A frequency-modulated continuous wave (FMCW) VCO 704 generates the reference signal 524, which can be a frequency-modulated signal 706, an example of which is depicted in FIG. 7. In accordance with an oscillator circuit 538 (of FIG. 6) implementation, this reference signal 524 can correspond to the frequency-modulated LO signal 614 (also of FIG. 6). As described above with reference to FIG. 3, the frequency-modulated signal 706 version of the reference signal 524, or chirp signal, can be applied during an uplink random-access channel (UL RACH) slot 708. Thus, the mixer 510 can upconvert an IF version of the transmit signal 722 to produce an RF version of the signal as the radar transmit signal 208 using the frequency-modulated signal 706.

As described herein, the radar receive signal 210 can result from multiple signals, such as a reflected signal 216, a jamming signal 218, a direct coupling signal 528, and so forth. Thus, the radar receive signal 210 can include multiple components. These components can include, for example, a reflection signal component 716, a jamming signal component 718, a noise signal component 720, and so forth. In FIG. 7, the radar receive signal 210 is indicated by "R(t)," which can be mathematically represented by, for instance:

$$R(t) = S_{FMCW}(t) + S_{int}(t) + n(t). \qquad (1)$$

The variable $S_{FMCW}(t)$ can correspond to the reflection signal component 716. This variable may also incorporate, in addition to aspects of the reflected signal 216, aspects of the direct coupling signal 528, which is also derived from the FMCW properties of the reference signal 524. The variable $S_{int}(t)$ can correspond to the jamming signal component 718 that may be interfering with object detection. The variable n(t) can correspond to the noise signal component 720 that includes noise received via the antenna 122-2 or that includes noise otherwise incorporated into the radar receive signal 210 as the composite signal 626 (of FIG. 6).

After amplification by the amplifier 516, the mixer 518 down converts the radar receive signal 210 using the reference signal 524, which is also indicated by C(t) in FIG. 7. A mixer 740 further down converts the radar receive signal 210 using the IF VCO 742 to produce a lower-frequency radar receive signal 210. This lower-frequency radar receive signal 210 is indicated by "Y(t)" in FIG. 7. A low-pass filter 744 (LP filter 744) passes relatively lower frequencies of the down-converted radar receive signal 210 to the ADC 520. The ADC 520 converts the radar receive signal 210 from an analog version to a digital version that includes multiple signal samples. The ADC 520 may also provide the digital radar receive signal 210 to a decision feedback equalizer 746 (DFE 746) for equalization.

The decision feedback equalizer 746 equalizes the digital radar receive signal 210 to reduce inter-symbol distortion. The equalized radar receive signal 210 is provided to a signal processor 748. The signal processor 748 can perform jammer detection 130 or proximity detection 134. One or more of the depicted components may be part of a modem 126, such as the signal processor 748, the decision feedback equalizer 746, or the ADC 520. These components may be part of another processor or circuit (e.g., an application processor 108 or sensors hub or processor) in other examples. Further, one or more of the depicted components, such as the decision feedback equalizer 746, may be omitted in certain implementations.

Some implementations are described in terms of a computing or electronic device that includes a first antenna that transmits the radar transmit signal and a second antenna that receives the radar receive signal. In other implementations, however, one device includes the antenna that transmits the radar transmit signal and another device includes the antenna that receives the radar receive signal. Thus, described techniques can be used in a "passive" radar or bi-static radar configuration in which different devices perform the transmission versus the reception of the radar signals, with at least the reception device including a jammer detection module 124. Example approaches to performing jammer detection 130 are described below with particular reference to FIGS. 9 to 11. Next, however, examples of jamming signal components 718 are described with reference to signals that are graphed in FIG. 8.

Figure 8:
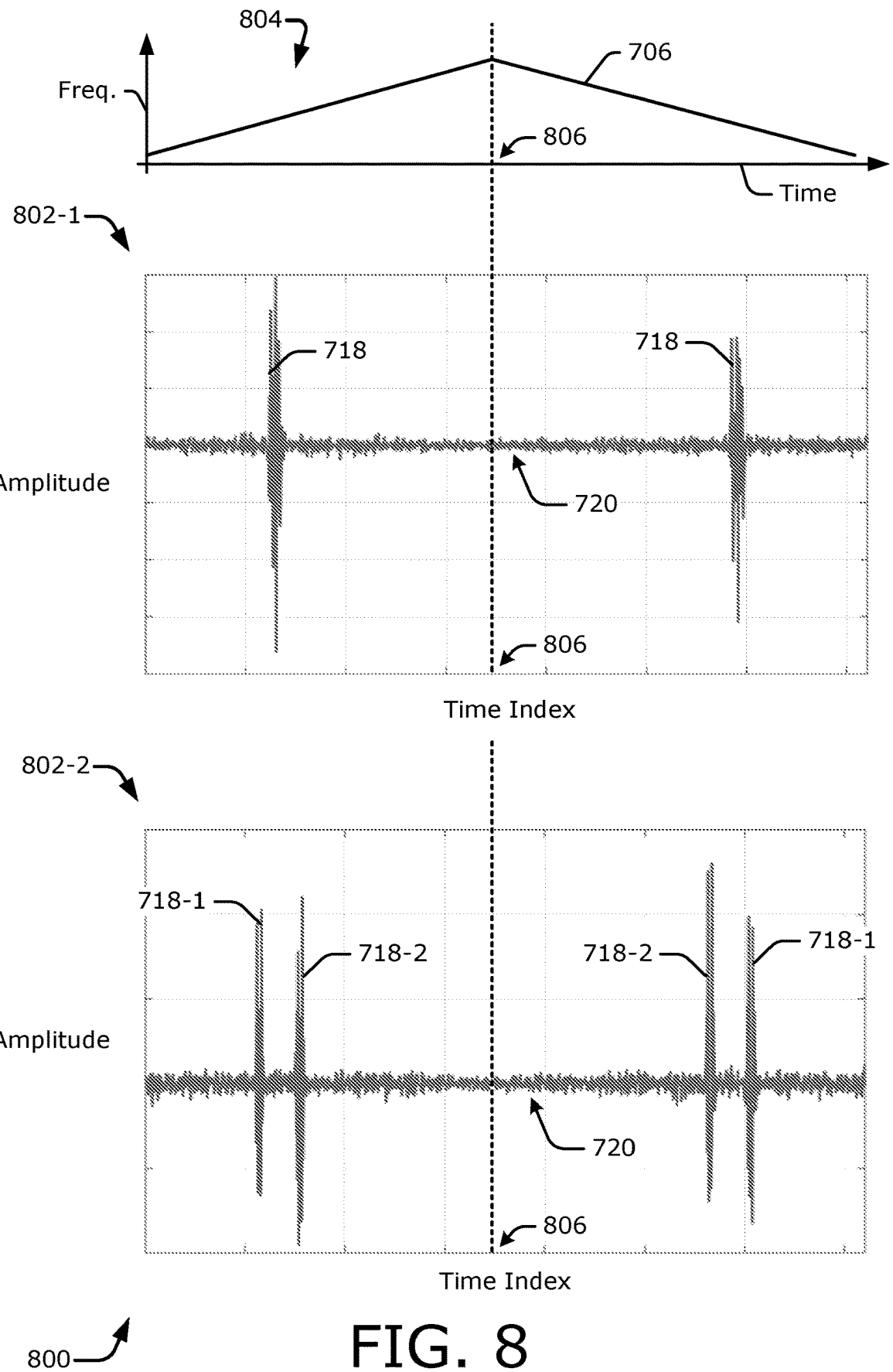
FIG. 8 includes multiple graphs of example radar receive signals that are in the time domain and that illustrate a presence of at least one jamming signal component.

FIG. 8 includes, generally at 800, multiple graphs 802-1 and 802-2 of example radar receive signals that are in the time domain and that illustrate a presence of at least one jamming signal component 718. FIG. 8 also includes a graph 804 that presents time along the x-axis and frequency along the y-axis. The graph 804 depicts an example frequency-modulated signal 706 that increases in frequency until a peak frequency value at time 806 and that then decreases in frequency.

FIG. 8 includes a first graph 802-1 that includes a noise signal component 720 and one jamming signal component 718. The jamming signal component 718 is present in the first graph 802-1 twice in the vicinity of the same frequency because the frequency "returns" to this same frequency as the frequency of the FMCW signal falls after the time 806. FIG. 8 includes a second graph 802-2 that includes the noise signal component 720 and two jamming signal components 718-1 and 718-2. Each jamming signal component 718 is present in the second graph 802-2 twice in the vicinity of the same respective frequency as the frequency increases and then decreases while time elapses.

Figure 9:
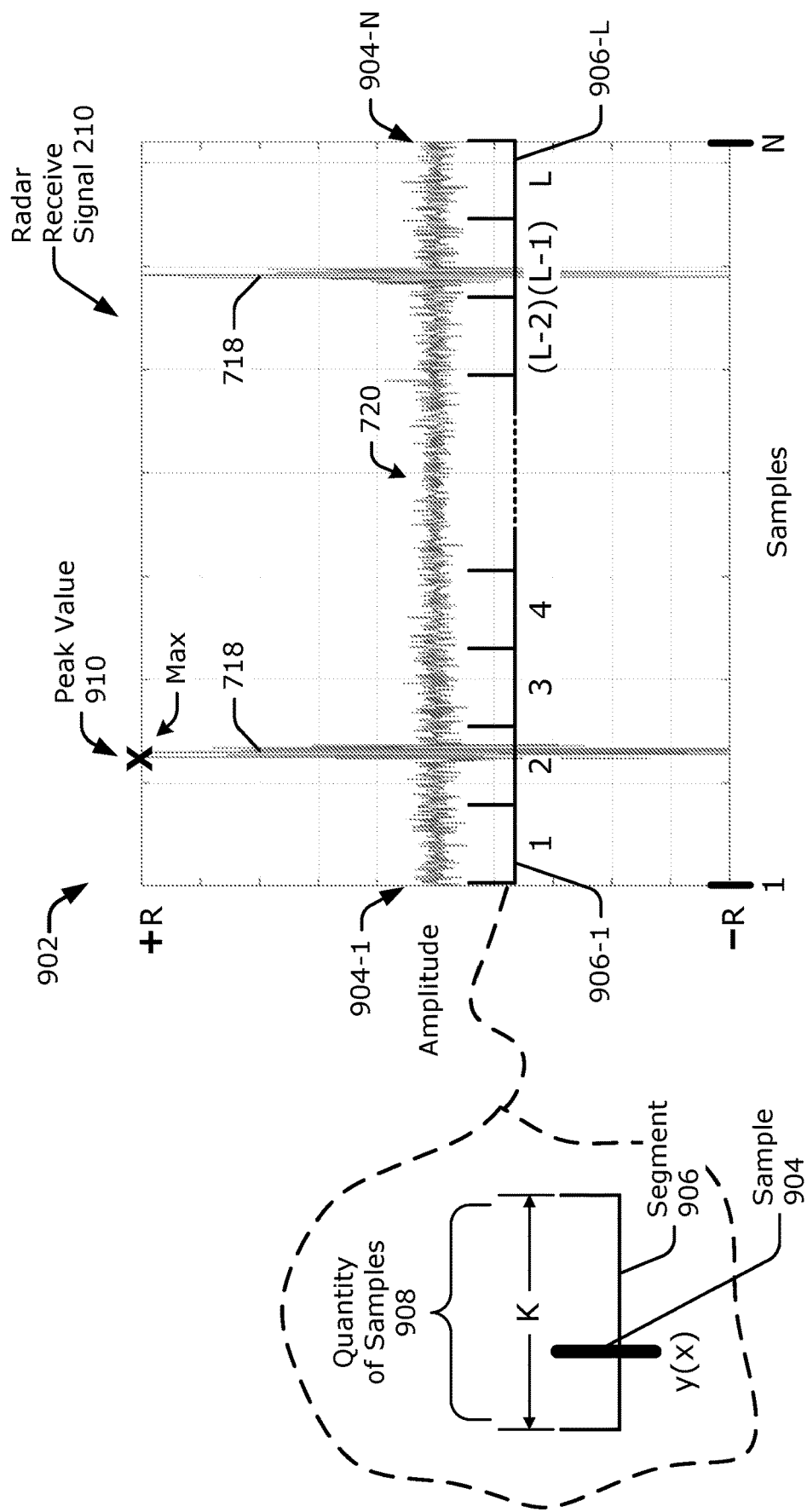
FIG. 9 includes a graph of an example radar receive signal that is in the time domain and that illustrates an example approach to organizing and processing samples of the signal to facilitate jammer detection.

FIG. 9 includes, generally at 900, a graph 902 of an example radar receive signal 210 that is in the time domain and that illustrates an example approach to organizing and processing samples 904 of the signal to facilitate jammer detection. The graph 902 depicts elapsed time in terms of samples 904 along the x-axis from 1 to N samples, with N representing a positive integer. The graph 902 depicts an amplitude of each sample 904 along the y-axis from a negative range "−R" to a positive range "+R."

In example implementations, the portion of the radar receive signal 210 that is being processed includes multiple samples 904-1 to 904-N. These N samples 904-1 to 904-N are separated or divided into multiple segments 906-1 to 906-L, with L representing a positive integer. Each segment 906 has a quantity of samples 908 of K, with K representing a positive integer.

There are K samples 904 in each segment 906, and there are L segments 906. Thus, in some cases, a product of K and L is at least approximately N. The K number of samples can be used to estimate the standard deviation (STD). Regarding selecting a value for K, there may be a trade-off between having sufficient samples to obtain an accurate estimate of the STD and detecting multiple different jamming signals within the radar receive signal portion being analyzed. The larger the value of K, the smaller the jamming signal bandwidth to be detected by certain implementations of the techniques described herein.

In the graph 902, the radar receive signal 210 includes at least a noise signal component 720 and at least one jamming signal component 718. The radar receive signal 210 also includes at least one peak value 910 that corresponds to a maximum amplitude (Max) of the samples 904-1 to 904-N and that is associated with the at least one jamming signal component 718. Each sample 904 is denoted generally by y(x), where x ranges from 1 to N. To compute an example jammer metric, the following equations (2) to (9) can be employed. First, there is a vector Y of the multiple samples 904-1 to 904-N, as defined by equation (2):

$$Y = [y(1) \ldots y(N)]. \qquad (2)$$

The peak value 910 is represented by the variable Z, which can be determined by finding the sample 904 with the greatest absolute value, as shown in equation (3):

$$Z = \max(|Y|). \qquad (3)$$

Instead of the true greatest absolute value, aspects of the detection technique can be applied, perhaps with some reduced effectiveness, by using a value of a sample 904 that is "close" to the sample having the maximum absolute value. For example, a determined peak value may be a value in the set of samples 904-1 to 904-N that is no more than a given percentage from the maximum value in the set of samples. In some cases, the given percentage may be twenty percent (20%), fifteen percent (15%), ten percent (10%), five percent (5%), three percent (3%), or even one percent (1%).

At least one statistical value is computed across at least a portion of the radar receive signal 210, such as for the noise signal component 720. For example, a statistical value can be computed across the L multiple segments 906-1 to 906-L. In some cases, a standard deviation can be computed over the noise of the radar receive signal 210 across each segment 906 of the multiple segments 906-1 to 906-L, as is given by the following equation (4):

$$\sigma(l) = STD([y((l-1)K+1) \ldots y(lK)]), \qquad (4)$$

where l takes values from 1 to L. Thus, a statistical characteristic of the noise component can be determined on a per-segment basis across multiple segments. A minimum standard deviation value is represented by the variable A, which can be determined from equation (5) below by analyzing the output of equation (4) above:

$$A = \min \sigma(l); l = 1 \ldots L. \qquad (5)$$

An example jammer metric H can be determined from equation (6) below:

$$H_{\frac{Max}{STD}} = \max\left[\frac{Z_{real}}{A_{real}}, \frac{Z_{imag}}{A_{imag}}\right], \qquad (6)$$

in which a maximum value of ratios determined for real and imaginary data sets of the radar receive signal 210 is determined for the jammer metric H. Thus, a jammer detection metric can be based on a ratio between a peak value 910 and a standard deviation of the noise signal component 720 of the radar receive signal 210.

The jammer detection metric is compared to at least one threshold (T). If the jammer metric H is greater than the threshold (T), then a glitch indicative of a jammer has been detected. On the other hand, if the jammer metric H is less than the threshold (T), then a glitch indicative of a jamming signal has not been detected. In other words, the jammer metric H given by the maximum ratio from equation (6) above is relatively larger if the radar receive signal 210 includes a jamming signal component 718, and this jammer metric H is relatively smaller if the radar receive signal 210 lacks a jamming signal component 718.

Equation (7) below sets forth this example jammer determination using the jammer metric H given by the maximum of the ratios set forth in equation (6):

$$H_{\frac{Max}{STD}} \overset{>1}{\underset{<0}{}} T. \tag{7}$$

In equation (7), the numeral "1" represents a jammer detection relative to the threshold (7), and the numeral "0" represents no jammer detection. If the values in the ratio are swapped (e.g., between numerator and denominator), then the comparison result that is indicative of an affirmative or negative jammer detection may be flipped. An example application of the organization of samples from FIG. 9 and the equations (2) to (7) above is described next with reference to FIG. 10.

A value for the threshold (7) may be determined based on a targeted probability of false alarm (PFA). Generally, the threshold (7) can be made smaller to increase the probability of detection. If the threshold (7) is too small, however, too many false jammer detections are triggered, and the detection scheme becomes relatively useless, or at least undermines the relevancy of proximity detection. Thus, the threshold (T) can be set by balancing the probability of false alarms versus the desirability of catching as many jamming incidents as is feasible. In some cases, a probability of false alarms can be set to be less than one percent (1%), such as less than one-half of one percent (<0.5%).

Figure 10:
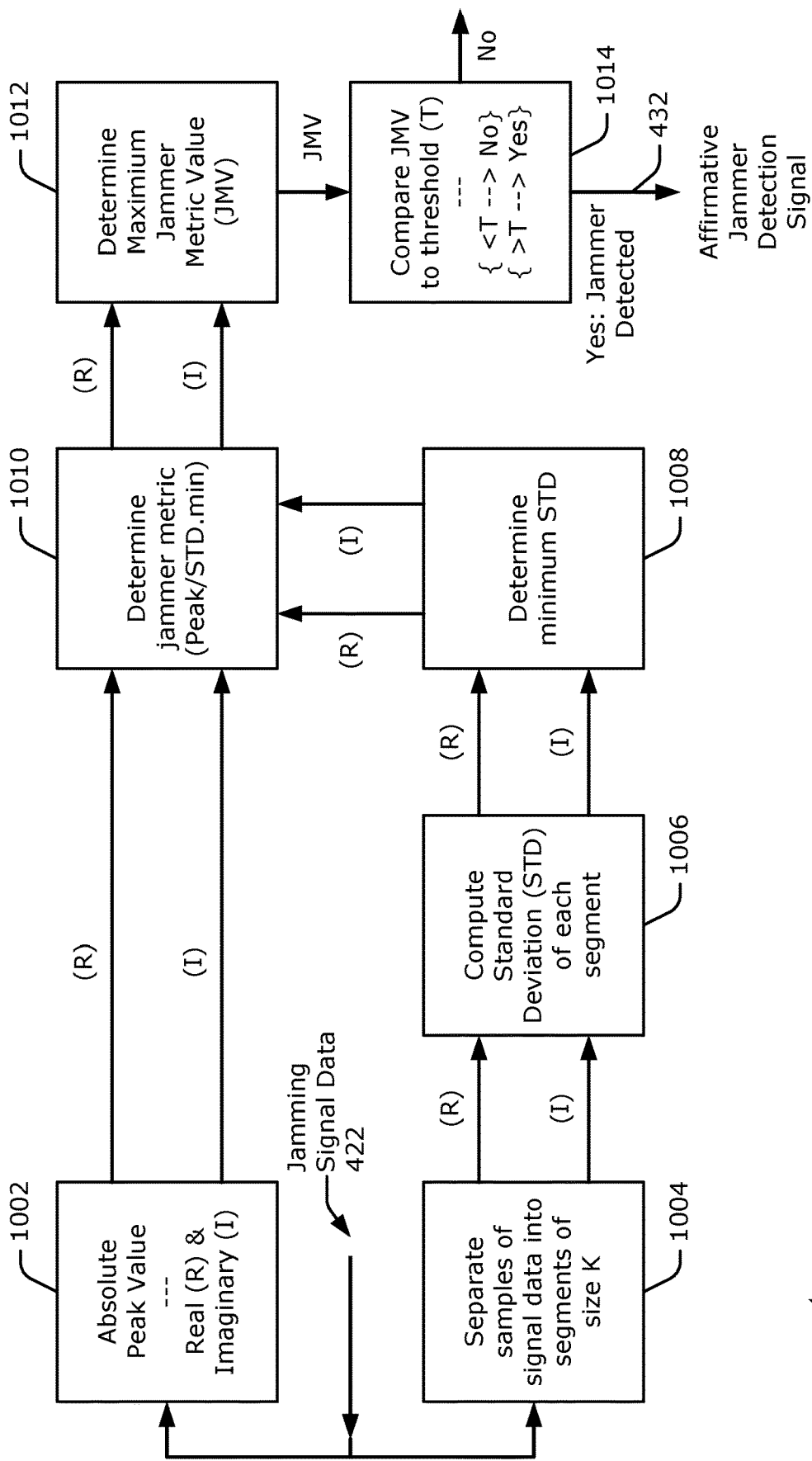
FIG. 10 illustrates example operations of a jammer detection module that can process the radar receive signal samples of FIG. 9 to detect a jamming signal component.

FIG. 10 illustrates, generally at 1000, example operations of a jammer detection module 124 (e.g., of FIGS. 1 and 5) that can process the radar receive signal samples of FIG. 9 to detect a jamming signal component 718 (of FIG. 7). As shown in FIG. 10, the jammer detection module 124 may perform operations 1002 to 1014. Of these, the jammer metric determiner 128 (of FIG. 1) may perform operations 1002 to 1010 to determine a jammer detection metric H. The jammer detection module 124 can receive jamming signal data 422, which has already undergone high-pass filtering. Alternatively, the jammer detection module 124 can receive radar receive signal data 420 (of FIG. 4) and perform high-pass filtering on this data to produce the jamming signal data 422.

In example operations, the jamming signal data 422 can include the multiple samples 904-1 to 904-N, which is represented by equation (2) above. At operation 1002, the jammer metric determiner 128 determines an absolute peak value, such as the peak value 910, which corresponds to a greatest absolute value of the amplitude range-R to +R that a sample 904 attains. The operation 1002 can correspond to implementing equation (3) above to determine the variable Z.

The operations of FIG. 10 can be performed on real and imaginary portions of the signal data, but such performance is not required in all examples. These portions are indicated by "R" for the real portion and by "I" for the imaginary portion. The real portion may correspond to in-phase signal values, and the imaginary portion may correspond to quadrature signal values. As indicated in FIG. 10, the illustrated operations 1002 to 1010 can be performed for the real and imaginary portions. The real and imaginary portions may be analyzed sequentially or fully or partially in parallel. The absolute peak values for the real and imaginary parts of the signal data may be made available as a result of operation 1002 for further processing at operation 1010.

The jamming signal data 422 is also analyzed in accordance with operations 1004 to 1008 on the real and imaginary portions of the samples. At operation 1004, the multiple samples 904-1 to 904-N of the jamming signal data 422 are separated into L segments 906-1 to 906-L having K samples per segment 906 as shown in FIG. 9. At operation 1006, a standard deviation (STD), or other statistical value, is computed on each segment 906 of the L segments. The operation 1006 can correspond to implementing equation (4) above to determine L versions of the standard deviation variable σ. From these L values of the standard deviation σ, the jammer metric determiner 128 determines a minimum standard deviation value at operation 1008. Thus, the operation 1008 can correspond to implementing equation (5) above to determine the variable A.

The minimum standard deviation, or A from equation (5) above, is made available for performance of the operation 1010 for the real and imaginary portions of the jamming signal data 422. At operation 1010, the jammer metric determiner 128 determines at least one jammer detection metric H. The jammer detection metric can be based on a ratio that includes the absolute peak value (Z) from the operation 1002 and the minimum standard deviation (A, $\sigma_{Min}$, or $STD_{Min}$) from operation 1008. In some cases, the ratio is calculated with the peak value in the numerator and the minimum standard deviation in the denominator. These ratio inputs may, however, be swapped, and then a detection determination made with respect to a threshold analysis is flipped.

At operation 1012, the jammer detection module 124 compares a real version of the jammer detection metric to an imaginary version of the jammer detection metric and selects the maximum, or the larger, of the two versions. Thus, the operations 1010 and 1012 can correspond to implementing equation (6) above to determine a maximum jammer metric value (JMV). The maximum jammer metric value can be used to determine if a jamming signal component 718 is present in the jamming signal data 422.

To determine if a jammer is detected, at operation 1014, the jammer detection module 124 compares the maximum jammer metric value to at least one threshold. If the maximum jammer metric value is less than the threshold (<T), then a no-jammer-detection decision is made. On the other hand, if the maximum jammer metric value is greater than the threshold (>T), then a jammer has been detected. The jammer detection module 124 can issue a jammer indication 542 (of FIG. 5) that includes an affirmative jammer detection signal 432 (of FIGS. 4 and 10). Thus, the operation 1014 can correspond to implementing equation (7) above to detect if a jamming signal component 718 has been received with the radar receive signal 210.

Implementing the operations 1002 to 1014 can provide several benefits. First, the process is robust to noise variation across parts and temperature. Second, the process can reliably detect jammers at low power. Third, the process provides a low probability of false alarms. Although described with respect to proximity detection 134, the techniques of implementing jammer detection 130 can also be applied in other wireless applications, including those that utilize full-duplex operation in which transmission and reception occur during a same time interval.

Figure 11:
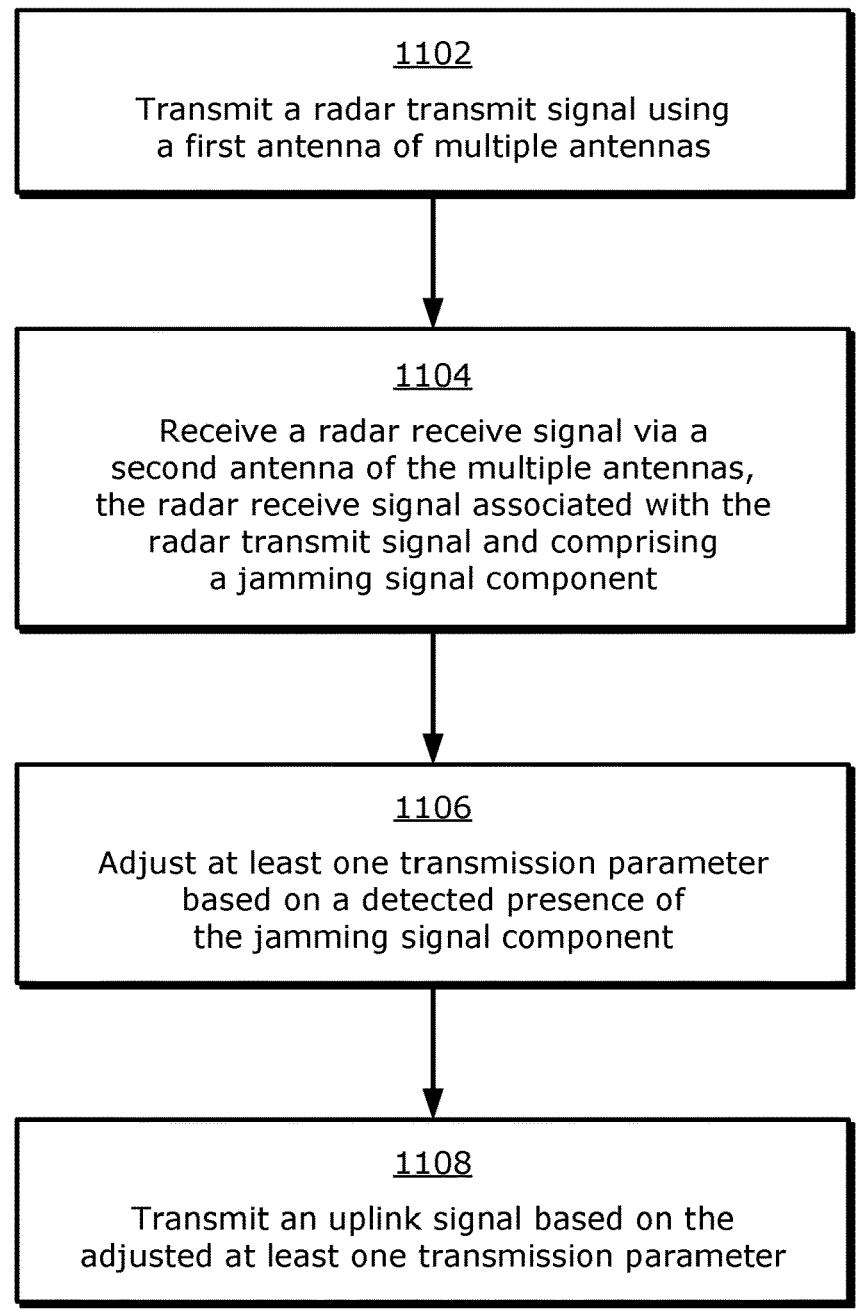
FIG. 11 is a flow diagram illustrating an example process for detecting a jamming signal component in a radar environment.

FIG. 11 is a flow diagram illustrating an example process 1100 for detecting a jamming signal component in a radar environment. The process 1100 includes four blocks 1102-1108 that specify operations that can be performed for a method. The process is described in the form of a set of blocks that specify operations that can be performed. However, operations are not necessarily limited to the order shown in the figures or described herein, for the operations may be implemented in alternative orders or in fully or partially overlapping manners. Also, more, fewer, and/or different operations may be implemented to perform a respective process or an alternative process.

At block 1102, a radar transmit signal is transmitted using a first antenna of multiple antennas. For example, a device 102 or 104 can transmit a radar transmit signal 208 using a first antenna 122-1 of multiple antennas 122-1 to 122-N. For instance, a transmitter 502 may transmit the radar transmit signal 208 with a changing frequency based on a transmit signal 722 being upconverted with a frequency-modulated local oscillator signal 614.

At block 1104, a radar receive signal is received via a second antenna of the multiple antennas, with the radar receive signal associated with the radar transmit signal and including a jamming signal component. For example, the device 102 or 104 can receive a radar receive signal 210 via a second antenna 122-2 of the multiple antennas 122-1 to 122-N, with the radar receive signal 210 associated with the radar transmit signal 208 and including a jamming signal component 718. In some cases, the radar receive signal 210 may include a reflection signal component 716, and in other cases the radar receive signal 210 may lack a reflection signal component 716.

At block 1106, at least one transmission parameter is adjusted based on a detected presence of the jamming signal component. For example, a modem 126 can adjust at least one transmission parameter 536 based on a detected presence of the jamming signal component 718. To do so, a signal processor 748 or a transmission control module 532 may change one or more transmission parameters 536 based on a determined jammer metric, which may be responsive to a peak value or a minimum standard deviation computed over noise of the radar receive signal 210, as is described above with reference to FIGS. 9 and 10.

At block 1108, an uplink signal is transmitted based on the adjusted at least one transmission parameter. For example, the device 102 or 104 can transmit an uplink signal 202 based on the adjusted at least one transmission parameter 536. Thus, to account for a possibility that the detected jamming signal component 718 may be obscuring a reflection signal component 716 in the radar receive signal 210, the transmitter 502 may transmit the uplink signal 202 with a changed parameter. Examples of adjusting at least one transmission parameter 536 may include reducing a transmission power level at the first antenna 122-1, changing a radiation pattern emanated from the first antenna 122-1, or switching transmission from the first antenna 122-1 to transmission from a different antenna of the multiple antennas 122-1 to 122-N.

This section describes some aspects of example implementations and/or example configurations related to the apparatuses and/or processes presented above.

Example aspect 1: An apparatus comprising:
a wireless transceiver configured to be connected to multiple antennas, the wireless transceiver configured to:
transmit a radar transmit signal using a first antenna of the multiple antennas;
receive a radar receive signal via a second antenna of the multiple antennas, the radar receive signal associated with the radar transmit signal and comprising a jamming signal component;
adjust at least one transmission parameter based on a detected presence of the jamming signal component; and
transmit an uplink signal based on the adjusted at least one transmission parameter.

Example aspect 2: The apparatus of example aspect 1, wherein:
the radar receive signal is associated with the radar transmit signal based at least on direct coupling between the first antenna and the second antenna;
the radar receive signal lacks a reflection signal component corresponding to a reflection of the radar transmit signal via an object; and
the wireless transceiver is configured to adjust the at least one transmission parameter based on the detected presence of the jamming signal component in an absence of the reflection signal component.

Example aspect 3: The apparatus of example aspect 1, wherein:
the radar receive signal is associated with the radar transmit signal based at least on the radar receive signal comprising a reflection signal component corresponding to a reflection of the radar transmit signal via an object; and
the wireless transceiver is configured to adjust the at least one transmission parameter based on a detected presence of the reflection signal component.

Example aspect 4: The apparatus of example aspect 3, wherein the wireless transceiver is configured to:
adjust the at least one transmission parameter based on the detected presence of the reflection signal component in an absence of a jamming signal component.

Example aspect 5: The apparatus of any one of the preceding example aspects, further comprising:
a jammer detection module configured to detect the jamming signal component of the radar receive signal based on a peak value and a noise component.

Example aspect 6: The apparatus of example aspect 5, wherein the jammer detection module is configured to:
detect the jamming signal component of the radar receive signal based on a statistical characteristic of the noise component.

Example aspect 7: The apparatus of example aspect 6, wherein:
the radar receive signal comprises a set of samples; and
the jammer detection module is configured to determine the peak value from the set of samples, the peak value comprising a value in the set of samples that is no more than a given percentage from a maximum value in the set of samples.

Example aspect 8: The apparatus of example aspect 7, wherein the given percentage comprises ten percent (10%).

Example aspect 9: The apparatus of example aspect 7 or 8, wherein:
the set of samples comprises multiple segments; and
the jammer detection module is configured to determine the statistical characteristic of the noise component on a per-segment basis across the multiple segments.

Example aspect 10: The apparatus of any one of example aspects 6 to 9, wherein the jammer detection module is configured to:
  detect the jamming signal component of the radar receive signal based on a standard deviation of the noise component.

Example aspect 11: The apparatus of example aspect 10, wherein the jammer detection module is configured to:
  detect the jamming signal component of the radar receive signal based on a ratio including the peak value and the standard deviation of the noise component.

Example aspect 12: The apparatus of example aspect 11, wherein the jammer detection module is configured to:
  detect the jamming signal component of the radar receive signal based on a comparison including the ratio and a threshold.

Example aspect 13: The apparatus of example aspect 12, wherein:
  the ratio comprises the peak value divided by the standard deviation of the noise component; and
  the jammer detection module is configured to:
    detect the jamming signal component and generate an affirmative detection signal responsive to the ratio being above the threshold; and
    generate a negative detection signal responsive to the ratio being below the threshold.

Example aspect 14: The apparatus of any one of example aspects 1 or 3 to 13, wherein:
  the radar receive signal comprises a reflection signal component corresponding to a reflection of the radar transmit signal via an object; and
  the apparatus further comprises:
    a proximity detection module configured to generate a detection signal based on the reflection signal component; and
    a jammer detection module configured to generate a detection signal based on the jamming signal component.

Example aspect 15: The apparatus of example aspect 14, further comprising:
  a modem coupled to the wireless transceiver, the modem comprising the proximity detection module and the jammer detection module.

Example aspect 16: The apparatus of example aspect 15, wherein:
  the modem is configured to cause the wireless transceiver to adjust the at least one transmission parameter based on an affirmative detection signal provided by at least one of the proximity detection module or the jammer detection module; and
  the wireless transceiver is configured to transmit the uplink signal using the adjusted at least one transmission parameter in a wireless communication mode.

Example aspect 17: The apparatus of example aspect 16, wherein the wireless transceiver is configured to:
  at least partially transmit the radar transmit signal and receive the radar receive signal during at least part of time slot for an uplink random-access channel (RACH) in a jammer detection or proximity detection mode.

Example aspect 18: A method comprising:
  transmitting a radar transmit signal using a first antenna of multiple antennas;
  receiving a radar receive signal via a second antenna of the multiple antennas, the radar receive signal associated with the radar transmit signal and comprising a jamming signal component;
  adjusting at least one transmission parameter based on a detected presence of the jamming signal component; and
  transmitting an uplink signal based on the adjusted at least one transmission parameter.

Example aspect 19: The method of example aspect 18, further comprising:
  detecting, in the radar receive signal, a reflection signal component corresponding to a reflection of the radar transmit signal via an object; and
  adjusting the at least one transmission parameter based on a detected presence of the reflection signal component.

Example aspect 20: The method of example aspect 19, further comprising:
  adjusting the at least one transmission parameter responsive to the radar receive signal including the reflection signal component and responsive to the radar receive signal lacking the reflection signal component based on the detected presence of the jamming signal component.

Example aspect 21: The method of any one of example aspects 18 to 20, further comprising:
  detecting the jamming signal component of the radar receive signal.

Example aspect 22: The method of example aspect 21, wherein the adjusting comprises:
  adjusting, based on the detecting, the at least one transmission parameter to decrease a radiation level corresponding to the transmitting of the radar transmit signal using the first antenna.

Example aspect 23: The method of example aspect 22, wherein the adjusting the at least one transmission parameter to decrease the radiation level comprises at least one of:
  reducing a transmission power level at the first antenna;
  changing a radiation pattern emanated from the first antenna; or
  switching transmission from the first antenna to transmission from a different antenna of the multiple antennas.

Example aspect 24: The method of any one of example aspects 21 to 23, wherein the detecting comprises:
  detecting the jamming signal component based on a standard deviation computed over noise of the radar receive signal.

Example aspect 25: The method of example aspect 24, wherein the detecting comprises:
  detecting the jamming signal component based on a peak value determined from the radar receive signal.

Example aspect 26: The method of example aspect 25, wherein the detecting comprises:
  detecting the jamming signal component based on a ratio between the peak value determined from the radar receive signal and the standard deviation computed over the noise of the radar receive signal.

Example aspect 27: An apparatus comprising:
  means for transmitting a radar transmit signal using a first antenna of multiple antennas;
  means for receiving a radar receive signal via a second antenna of the multiple antennas, the radar receive signal associated with the radar transmit signal and comprising a jamming signal component;
  means for adjusting at least one transmission parameter based on a detected presence of the jamming signal component; and
  means for transmitting an uplink signal based on the adjusted at least one transmission parameter.

Example aspect 28: A device configured to:

receive a radar receive signal comprising a jamming signal component;

cause at least one transmission parameter to be adjusted based on the jamming signal component and regardless of a presence or an absence of a reflection signal component within the radar receive signal; and transmit an uplink signal based on the adjusted at least one transmission parameter.

Example aspect 29: The device of example aspect 28, wherein:

the radar receive signal lacks the reflection signal component; and the device is configured to cause the at least one transmission parameter to decrease a radiation level corresponding to transmission of a radar transmit signal associated with the radar receive signal.

Example aspect 30: The device of example aspect 29, wherein the device is configured to adjust the at least one transmission parameter to decrease the radiation level corresponding to transmission of the radar transmit signal by at least one of:

reducing a transmission power level at an antenna of transmission;

changing a radiation pattern emanated from the antenna of transmission; or switching transmission from the antenna of transmission to a different antenna of multiple antennas.

Example aspect 31: The device of any one of example aspects 28-30, wherein the device comprises a consumer premises equipment configured to communicate with a cellular network.

Example aspect 32: The apparatus of example aspect 27, wherein the apparatus comprises a consumer premises equipment configured to communicate with a cellular network.

Example aspect 33: The method of any one of example aspects 18-26, wherein the method is performed by a consumer premises equipment configured to communicate with a cellular network.

Example aspect 34: The apparatus of any one of example aspects 1-17, wherein the apparatus comprises a consumer premises equipment configured to communicate with a cellular network.

As used herein, the terms "couple," "coupled," or "coupling" refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The term "node" (e.g., including a "first node" or a "local oscillator node") represents at least a point of electrical connection between two or more components (e.g., circuit elements). Although at times a node may be visually depicted in a drawing as a single point, the node can represent a connection portion of a physical circuit or network that has approximately a same voltage potential at or along the connection portion between two or more components. In other words, a node can represent at least one of multiple points along a conducting medium (e.g., a wire or trace) that exists between electrically connected components. Similarly, a "terminal" or "port" may represent one or more points with at least approximately a same voltage potential relative to an input or output of a component (e.g., a mixer).

The terms "first," "second," "third," and other numeric-related indicators are used herein to identify or distinguish similar or analogous items from one another within a given context-such as a particular implementation, a single drawing figure, a given component, or a claim. Thus, a first item in one context may differ from a first item in another context. For example, an item identified as a "first sample" in one context may be identified as a "second sample" in another context. Similarly, a "first detection metric" or a "first radar receive signal" in one claim may be recited as a "second detection metric" or a "third radar receive signal," respectively, in a different claim (e.g., in separate claim sets). An analogous interpretation applies to differential-related terms such as a "plus signal component" and a "minus signal component" and to real-imaginary signal parts such as "real signal data" and "imaginary signal data."

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description.

Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed. Rather, the specific features and methods are disclosed as example implementations for jammer detection.

What is claimed is:

1. An apparatus comprising:
a wireless transceiver configured to be connected to multiple antennas, the wireless transceiver configured to:
transmit a radar transmit signal using a first antenna of the multiple antennas;
receive a radar receive signal via a second antenna of the multiple antennas, the radar receive signal associated with the radar transmit signal and comprising a jamming signal component;
adjust at least one transmission parameter based on a detected presence of the jamming signal component; and
transmit an uplink signal based on the adjusted at least one transmission parameter,
wherein the radar receive signal is associated with the radar transmit signal based at least on direct coupling between the first antenna and the second antenna, the radar receive signal lacks a reflection signal component corresponding to a reflection of the radar transmit signal via an object, and the wireless transceiver is configured to adjust the at least one transmission parameter based on the detected presence of the jamming signal component in an absence of the reflection signal component.

2. The apparatus of claim 1, further comprising:
a jammer detection module configured to detect the jamming signal component of the radar receive signal based on a peak value and a noise component.

3. The apparatus of claim 2, wherein the jammer detection module is configured to:
detect the jamming signal component of the radar receive signal based on a statistical characteristic of the noise component.

4. The apparatus of claim 3, wherein:
the radar receive signal comprises a set of samples; and
the jammer detection module is configured to determine the peak value from the set of samples, the peak value comprising a value in the set of samples that is no more than a given percentage from a maximum value in the set of samples.

5. The apparatus of claim 4, wherein:
the set of samples comprises multiple segments; and
the jammer detection module is configured to determine the statistical characteristic of the noise component on a per-segment basis across the multiple segments.

6. The apparatus of claim 3, wherein the jammer detection module is configured to:
detect the jamming signal component of the radar receive signal based on a standard deviation of the noise component.

7. The apparatus of claim 6, wherein the jammer detection module is configured to:
detect the jamming signal component of the radar receive signal based on a ratio including the peak value and the standard deviation of the noise component.

8. An apparatus, comprising:
a wireless transceiver configured to be connected to multiple antennas, the wireless transceiver configured to:
transmit a radar transmit signal using a first antenna of the multiple antennas;
receive a radar receive signal via a second antenna of the multiple antennas, the radar receive signal associated with the radar transmit signal and comprising a jamming signal component, the radar receive signal comprising a reflection signal component corresponding to a reflection of the radar transmit signal via an object;
adjust at least one transmission parameter based on a detected presence of the jamming signal component; and
transmit an uplink signal based on the adjusted at least one transmission parameter; and
a modem coupled to the wireless transceiver, the modem comprising:
a proximity detection module configured to generate a detection signal based on the reflection signal component; and
a jammer detection module configured to generate a detection signal based on the jamming signal component.

9. The apparatus of claim 8, wherein:
the modem is configured to cause the wireless transceiver to adjust the at least one transmission parameter based on an affirmative detection signal provided by at least one of the proximity detection module or the jammer detection module; and
the wireless transceiver is configured to transmit the uplink signal using the adjusted at least one transmission parameter in a wireless communication mode.

10. The apparatus of claim 9, wherein the wireless transceiver is configured to:
at least partially transmit the radar transmit signal and receive the radar receive signal during at least part of time slot for an uplink random-access channel (RACH) in a jammer detection or proximity detection mode.

11. A method comprising:
transmitting a radar transmit signal using a first antenna of multiple antennas;
receiving a radar receive signal via a second antenna of the multiple antennas, the radar receive signal associated with the radar transmit signal and comprising a jamming signal component;
detecting the jamming signal component of the radar receive signal;
adjusting at least one transmission parameter based on the detected jamming signal component to decrease a radiation level corresponding to the transmitting of the radar transmit signal using the first antenna; and
transmitting an uplink signal based on the adjusted at least one transmission parameter.

12. The method of claim 11, further comprising:
detecting, in the radar receive signal, a reflection signal component corresponding to a reflection of the radar transmit signal via an object; and
adjusting the at least one transmission parameter based on a detected presence of the reflection signal component.

13. The method of claim 12, further comprising:
adjusting the at least one transmission parameter responsive to the radar receive signal including the reflection signal component and responsive to the radar receive signal lacking the reflection signal component based on the detected presence of the jamming signal component.

14. The method of claim 11, wherein the adjusting the at least one transmission parameter to decrease the radiation level comprises at least one of:
reducing a transmission power level at the first antenna;
changing a radiation pattern emanated from the first antenna; or
switching transmission from the first antenna to transmission from a different antenna of the multiple antennas.

15. The method of claim 11, wherein the detecting comprises:
detecting the jamming signal component based on a standard deviation computed over noise of the radar receive signal.

16. The method of claim 15, wherein the detecting comprises:
detecting the jamming signal component based on a peak value determined from the radar receive signal.

17. The method of claim 16, wherein the detecting comprises:
detecting the jamming signal component based on a ratio between the peak value determined from the radar receive signal and the standard deviation computed over the noise of the radar receive signal.

18. An apparatus comprising:
a wireless transceiver configured to be connected to multiple antennas, the wireless transceiver configured to:

transmit a radar transmit signal using a first antenna of the multiple antennas;
receive a radar receive signal via a second antenna of the multiple antennas, the radar receive signal associated with the radar transmit signal and comprising a jamming signal component;
adjust at least one transmission parameter based on a detected presence of the jamming signal component; and
transmit an uplink signal based on the adjusted at least one transmission parameter; and
a jammer detection module configured to detect the jamming signal component of the radar receive signal based on a peak value and a noise component.

19. The apparatus of claim 18, wherein:
the radar receive signal is associated with the radar transmit signal based at least on the radar receive signal comprising a reflection signal component corresponding to a reflection of the radar transmit signal via an object; and
the wireless transceiver is configured to adjust the at least one transmission parameter based on a detected presence of the reflection signal component.

20. The apparatus of claim 19, wherein the wireless transceiver is configured to:
adjust the at least one transmission parameter based on the detected presence of the reflection signal component in an absence of a jamming signal component.

21. The apparatus of claim 18, wherein the jammer detection module is configured to:
detect the jamming signal component of the radar receive signal based on a statistical characteristic of the noise component.

22. The apparatus of claim 21, wherein:
the radar receive signal comprises a set of samples; and
the jammer detection module is configured to determine the peak value from the set of samples, the peak value comprising a value in the set of samples that is no more than a given percentage from a maximum value in the set of samples.

23. The apparatus of claim 22, wherein the given percentage comprises ten percent (10%).

24. The apparatus of claim 22, wherein:
the set of samples comprises multiple segments; and
the jammer detection module is configured to determine the statistical characteristic of the noise component on a per-segment basis across the multiple segments.

25. The apparatus of claim 21, wherein the jammer detection module is configured to:
detect the jamming signal component of the radar receive signal based on a standard deviation of the noise component.

26. The apparatus of claim 25, wherein the jammer detection module is configured to:
detect the jamming signal component of the radar receive signal based on a ratio including the peak value and the standard deviation of the noise component.

27. The apparatus of claim 26, wherein the jammer detection module is configured to:
detect the jamming signal component of the radar receive signal based on a comparison including the ratio and a threshold.

28. The apparatus of claim 27, wherein:
the ratio comprises the peak value divided by the standard deviation of the noise component; and
the jammer detection module is configured to:
detect the jamming signal component and generate an affirmative detection signal responsive to the ratio being above the threshold; and
generate a negative detection signal responsive to the ratio being below the threshold.

* * * * *